US008012557B2

(12) United States Patent
Hseih et al.

(10) Patent No.: US 8,012,557 B2
(45) **Date of Patent: *Sep. 6, 2011**

(54) LABEL ASSEMBLY AND METHOD OF USING THE SAME TO LABEL ARTICLES DURABLY YET REMOVABLY

(75) Inventors: Dong-Tsai Hseih, Arcadia, CA (US); Kuolih Tsai, Arcadia, CA (US); Yi-Hung Chiao, Temple City, CA (US); Xiao-Ming He, Arcadia, CA (US); Li Shu, Arcadia, CA (US); Ramin Heydarpour, Beverly Hills, CA (US); Alan Morgenthau, Keene, NH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/804,265

(22) Filed: Jul. 16, 2010

(65) Prior Publication Data

US 2011/0027546 A1 Feb. 3, 2011

Related U.S. Application Data

(62) Division of application No. 10/754,893, filed on Jan. 9, 2004, now Pat. No. 7,758,938.

(51) Int. Cl.

| | |
|---|---|
| ***B32B 7/06*** | (2006.01) |
| ***B29C 65/00*** | (2006.01) |
| ***B41D 7/00*** | (2006.01) |
| ***B41C 1/06*** | (2006.01) |

(52) U.S. Cl. ..................... 428/40.1; 428/40.5; 428/41.3; 428/41.5; 428/41.7; 428/42.1; 428/42.2; 428/200; 428/202; 428/913.3; 428/914; 156/247; 156/281; 156/389; 101/33; 101/34

(58) Field of Classification Search ................. 428/40.1, 428/40.5, 41.3, 41.5, 41.7, 42.1, 42.2, 200, 428/202, 914, 913.3

See application file for complete search history.

(56) References Cited

U.S. PATENT DOCUMENTS

| | | | |
|---|---|---|---|
| 4,909,151 | A | 3/1990 | Fukui et al. |
| 5,353,108 | A | 10/1994 | Tsukamoto |
| RE37,645 | E | 4/2002 | Takahashi et al. |
| 6,767,591 | B2 | 7/2004 | Meccia et al. |
| 6,850,729 | B2 | 2/2005 | Kobayashi et al. |
| 6,942,912 | B1 | 9/2005 | Blom et al. |

*Primary Examiner* — Victor S Chang

(74) *Attorney, Agent, or Firm* — Kriegsman & Kriegsman

(57) ABSTRACT

A label assembly and method of using the same to label articles durably, yet removably. In one embodiment, the label assembly is used to label fabric articles, such as clothing, and comprises (a) an image forming laminate for forming an image on the fabric article, the image forming laminate comprising an ink layer, the ink layer being bondable to the fabric article; and (b) an image removing laminate for removing the image from the fabric article, the image removing laminate comprising a remover layer, the remover layer, upon being activated by heat and/or light, being bondable to the ink layer of the image forming laminate; (c) whereby, upon bonding of the image removing laminate to the ink layer, the bonding between the image removing laminate and the ink layer is stronger than the bonding between the ink layer and the fabric article.

18 Claims, 9 Drawing Sheets

LABEL ASSEMBLY AND METHOD OF USING THE SAME TO LABEL ARTICLES DURABLY YET REMOVABLY

CROSS-REFERENCE TO RELATED APPLICATIONS

The present application is a divisional of U.S. patent application Ser. No. 10/754,893, inventors Hseih et al., filed Jan. 9, 2004 now U.S. Pat. No. 7,758,938, the disclosure of which is incorporated herein by reference.

BACKGROUND OF THE INVENTION

The present invention relates generally to the labeling of articles and relates more particularly to a novel label assembly suitable for use in labeling articles durably yet removably.

Adhesive labels are currently applied to a wide variety of articles for many different types of purposes. Examples of such labeled articles include, but are not limited to, commercial vehicles adorned with decals that identify a business name or trademark of the vehicle owner, window storefronts labeled with decals that disclose the name of the business, private vehicles decorated with bumper stickers that display a message wished to be conveyed by the vehicle owner, and containers for beverages, detergents or health and beauty aids decorated with labels that identify the type of product contained therein and/or a trademark for the product. Even wooden tabletops have been decorated by certain restaurant chains with adhesive labels displaying a restaurant logo or the like.

Garments and other finished fabrics (e.g., towels, bed linens, tablecloths, etc.) have traditionally been labeled using one or more of the following: hanging tags conveying price and similar information; pressure-sensitive adhesive stickers denoting size and similar information; and cloth tags conveying article size, fiber content, instructions for care, and the manufacturer's name or trademark. Whereas the above-mentioned hanging tags and stickers are typically intended to be removed by a consumer after purchase of the article, the above-mentioned cloth tags are typically not intended to be removed by the consumer after the purchase of the article, but rather, are intended to be permanently affixed to the article. In fact, such tags are commonly known in the industry as permanent care labels and typically are sewn directly onto the article.

Unfortunately, the presence of a permanent care label on certain articles, such as undergarments or other garments in which the label is in direct contact with the wearer's skin, can become irritating to the wearer. As a result, it is not uncommon for a wearer of such a garment to remove the permanent care label, typically by cutting or simply by ripping the permanent care label from the garment. However, as can readily be appreciated, such a practice not only results in a loss of the information contained on the label but the act of cutting or ripping the permanent care label from the garment can also result in significant damage to the garment, itself.

A recent approach to this problem has been to replace the aforementioned permanent care cloth label sewn onto the garment with a heat-transfer permanent care label adhered to the garment. An example of the aforementioned approach is disclosed in commonly-assigned PCT Application No. PCT/US03/38315 entitled METHOD FOR LABELING FABRICS AND HEAT-TRANSFER LABEL WELL-SUITED FOR USE IN SAID METHOD, filed Dec. 2, 2003, the entire disclosure of which is incorporated herein by reference.

Other documents relating to the labeling of garments using heat-transfer technology include the following U.S. patents, all of which are incorporated herein by reference: U.S. Pat. No. 6,423,466, inventors Hare et al., which issued Jul. 23, 2002; U.S. Pat. No. 6,383,710, inventors Hare et al., which issued May 7, 2002; U.S. Pat. No. 5,813,772, inventors Magill et al., which issued Sep. 29, 1998; U.S. Pat. No. 5,411,783, inventor Mahn, Jr., which issued May 2, 1995; U.S. Pat. No. 4,786,349, inventor Mahn, Sr., which issued Nov. 22, 1988; U.S. Pat. No. 4,256,795, inventors Day et al., which issued Mar. 17, 1981; U.S. Pat. No. 3,992,559, inventors Day et al., which issued Nov. 16, 1976; U.S. Pat. No. 3,959,555, inventors Day et al., which issued May 25, 1976; U.S. Pat. No. 3,920,499, inventors Day et al., which issued Nov. 18, 1975; and U.S. Reissue Pat. No. 28,542, inventor Meyer, which reissued Sep. 2, 1975.

One problem that has been noted in connection with the application of heat-transfer labels to articles is that a small percentage of the labels tend to be improperly applied to the article (e.g., the label is improperly positioned on the article, the label is incompletely transferred to the article, the wrong label is inadvertently transferred to the article). For certain types of articles, this problem can be remedied by removing the heat-transfer label from the article (by peeling or scraping the label from the article and/or by treating the label with a solvent to dissolve the label) and then by applying another label to the article. However, such a remedy is often not feasible in the case of a permanent care label applied to a garment or like fabric article because the fabric article may be damaged by picking at or scraping the overlying label or by contacting the fabric with a dissolving solvent. This difficulty is exacerbated by the fact that the permanent care label, by its very design, is intended to remain adhered to fabric under adverse conditions, such as laundering. If an improperly applied heat-transfer permanent care label cannot be removed from a garment or other fabric article to which it is attached, it may be necessary to discard the article or to sell it a reduced price, both of which are clearly undesirable options.

Accordingly, one approach that has been taken to remove heat-transfer permanent care labels from fabric has been to apply, under pressure, a strip of aggressive, pressure-sensitive tape to the label and then to peel the tape and adhered label away from the underlying fabric. Unfortunately, this approach is limited in its utility in that it can only be performed with any degree of success during a window of approximately ten minutes following application of the label onto the fabric. (After said approximately ten minute window, the aforementioned technique does not typically result in adequate removal of the label from the fabric.) However, such a short window of time for remedying labeling errors is disadvantageous because it typically requires the same individual who is involved in applying the labels to the articles also to inspect the labeled articles and to remove any misapplied labels. As can readily be appreciated, these additional responsibilities typically lead to a reduction in the number of properly labeled articles that can be processed by a given individual.

SUMMARY OF THE INVENTION

It is an object of the present invention to provide a new label assembly.

It is another object of the present invention to provide a label assembly as described above that overcomes at least some of the shortcomings discussed above in connection with existing label assemblies.

It is still another object of the present invention to provide a label assembly as described above that can be used to form a lasting, yet removable, image on an article.

In furtherance of the above and other objects to be set forth or to become apparent from the description to follow, and according to one aspect of the invention, there is provided a label assembly suitable for use in forming a lasting, yet removable, image on an article, said label assembly comprising (a) an image forming laminate for forming an image on the article, said image forming laminate comprising an ink layer, said ink layer being bondable to the article; and (b) an image removing laminate for removing said image from the article, said image removing laminate comprising a remover layer, said remover layer, upon being activated by heat and/or radiation, being bondable to said ink layer of said image forming laminate; (c) whereby, upon bonding of said image removing laminate to said ink layer, the bonding between said image removing laminate and said ink layer is stronger than the bonding between said ink layer and the article.

As used in the present specification and claims, a statement that the bonding between the image removing laminate and ink layer is stronger than the bonding between the ink layer and the article encompasses any of the following variations: (a) either direct or indirect contact between the ink layer and the remover layer; (b) either direct or indirect contact between the ink layer and the article; (c) removal of the entire image forming laminate, including the ink layer, from the article; and (d) removal of a portion of the image forming laminate including the ink layer from the article, leaving another portion of the image forming laminate still adhered to the article.

In a first type of image forming laminate construction, the image forming laminate further comprises an image support securely bonded directly to said ink layer, said image support facing towards the article and said ink layer facing away from the article. The image support may be capable of adhering directly to the article, preferably after activation of said image support by heat and/or light. Alternatively, the image forming laminate may further comprise an adhesive layer coupled to the surface of the image support opposite the ink layer, said adhesive layer preferably being a heat- and/or light-activatable adhesive. The image forming laminate may further comprise a protective layer, said protective layer being coupled to the surface of the ink layer opposite the image support.

In a second type of image forming laminate construction, the image forming laminate further comprises an image support releasably coupled to said ink layer, said image support being adapted to be removed from said ink layer following bonding of said ink layer to the article. The ink layer may be capable of adhering directly to the article, preferably after activation of said ink layer by heat and/or light. Alternatively, the image forming laminate may further comprise an adhesive layer coupled to the surface of the ink layer opposite the image support, said adhesive layer preferably being activatable by heat and/or light. The adhesive layer may be adhered directly to the ink layer or may be adhered to the ink layer through a primer layer. The image forming laminate may further comprise a protective layer, said protective layer being coupled to the surface of the ink layer opposite the adhesive layer. The protective layer may be adhered directly to the ink layer on one surface and adhered directly to the image support on its opposite surface. Alternatively, a wax release layer may be interposed between the image support and the protective layer.

The image removing laminate of the above-described label assembly preferably further comprises a remover support securely bonded to said remover layer, said remover support either being bonded directly to said remover layer or being bonded indirectly to said remover layer through an intermediate tie layer. Not only is the bond between said remover layer and said ink layer stronger than the bond between said ink layer and the article, but the bond between the remover support and said remover layer is also stronger than the bond between the ink layer and the article; in this manner, the ink layer may be removed by bonding the remover layer to the ink layer and then by pulling said remover support away from the article.

The present invention is also directed individually to the above-described image forming laminate and to the above-described image removing laminate.

The present invention is additionally directed to a method of forming an image on an article using said image forming laminate and to a method of removing an image from the article using said image removing laminate.

For purposes of the present specification and claims, it is to be understood that certain terms used herein, such as "on" or "over," when used to denote the relative positions of two or more layers of a label, are primarily used to denote such relative positions in the context of how those layers are situated prior to application of the label to an article since, after application, the arrangement of layers is inverted.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

As noted above, the present invention is directed to a novel label assembly suitable for use in forming a lasting, yet removable, image on an article. Such a label assembly includes two components: (i) an image forming laminate; and (ii) an image removing laminate. As will hereinafter be described, the image forming laminate is used to form a lasting image on the article, and the image removing laminate is used to remove the lasting image from the article.

Figure 1:
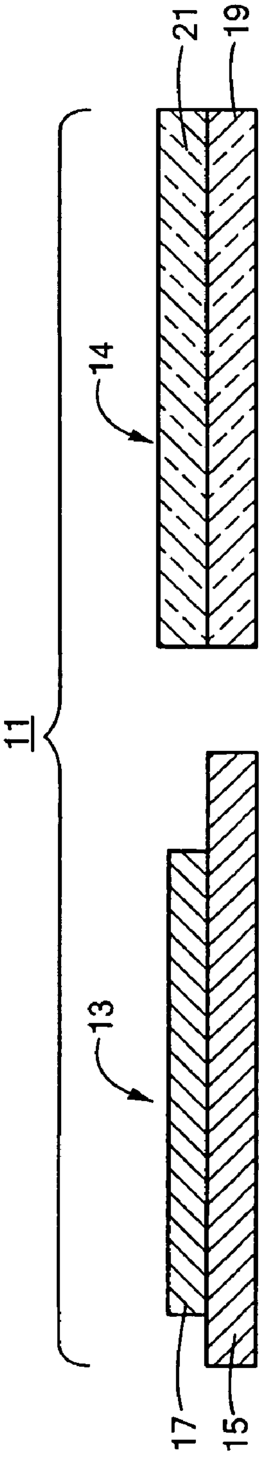
FIG. 1 is a schematic section view of a first embodiment of a label assembly suitable for use in forming a lasting, yet removable, image on an article, said label assembly being constructed according to the teachings of the present invention.

Referring now to FIG. 1, there is shown a schematic section view of a first embodiment of a label assembly suitable for use in forming a lasting, yet removable, image on an article, said label assembly being constructed according to the teachings of the present invention and represented generally by reference numeral 11.

Label assembly 11 comprises an image forming laminate 13 and an image removing laminate 14.

Image forming laminate 13 comprises an image support 15 and an ink layer 17, ink layer 17 being positioned directly on top of image support 15, preferably by printing ink layer 17 onto support 15. Support 15 may be, for example, a uniform sheet of material of a suitable thickness that is directly bondable, upon activation by heat (preferably at typical heat-transfer temperatures) and/or light, to a desired article pressed into contact therewith. (Prior to being activated by heat and/or light, support 15 serves to provide structural support to ink layer 15 to permit handling of image forming laminate 13.) In addition, support 15 preferably has a sufficiently smooth top surface to enable the legible printing of ink layer 17 thereonto. The present inventors have determined that, to permit highly legible printing thereonto, the surface roughness of support 15 preferably should not exceed more than about 15 microns. Materials usable as support 15 include, for example, PVC-based, polyester-based, polyurethane-based or acrylic-based films having suitable strength, bondability, and smoothness to be used in the manner described above. A specific example of a composition suitable for use in forming support 15 comprises 100 parts Geon 178 polyvinyl chloride resin (PolyOne, Avon Lake, Ohio), 53 parts Solvesso 100 hydrocarbon solvent (Exxon Chemical, Houston, Tex.), 16 parts of G59 plasticizer (C. P. Hall, Bedford Park, Ill.) and 29 parts titanium dioxide pigment (DuPont, Wilmington, Del.). (For purposes of the present specification and claims, the term polyvinyl chloride (PVC) is defined to encompass both homopolymers and copolymers of vinyl chloride.)

Ink layer 17, which may actually comprise either a single ink layer or a stacked plurality of ink layers, preferably has an overall thickness of about 0.1 to 30 microns, more preferably about 1 to 20 microns, and may be formed from any one or more inks that are compatible with image support 15 and adhere sufficiently well thereto to form a lasting image. Where, for example, image support 15 is the above-described PVC-based film, ink layer 17 may be formed, for example, by thermal transfer printing, laser printing, or ink jet printing a suitable ink onto support 15. Preferably, such printing involves printing a thermal transfer ribbon ink (e.g., AXR 600 thermal transfer ribbon ink, Armor, Hebron, Ky.) onto support 15, preferably using a near-edge thermal transfer printer. As can readily be appreciated, a thermal transfer printer, an ink jet printer, a laser printer or like device may be connected to a computer in such a manner that a digital image generated by or selected using the computer may be printed with the printer. Such a computer could be a stand-alone personal computer or could be a computer connected to a network through a mainframe, through the Internet, etc.

Alternatively, where image support 15 is the foregoing PVC-based film, ink layer 17 may also be formed by depositing a PVC ink onto support 15, preferably by screen printing, gravure printing or flexographic printing, and, thereafter, allowing any volatile component(s) of the ink composition to evaporate, leaving only the non-volatile ink components to form layer 17. An example of a PVC ink suitable for use in forming ink layer 17 comprises 100 parts GNS Bear's Navy ink (PolyOne Corporation, Avon Lake, Ohio), 10 parts Acumist B9 wax (Honeywell International Inc., Morristown, N.J.), 5 parts Geon 137 PVC resin (PolyOne Corporation, Avon Lake, Ohio) and 1 part zinc oxide (Sigma-Aldrich Co., Milwaukee, Wis.) as a cross-linker. In the case of the aforementioned PVC ink, there are no volatile components that must be allowed to evaporate; nevertheless, the printed product must be heated, typically in an IR or UV oven, to fuse, gel or "cure" ink layer 17.

Where support 15 is acrylic-based, polyester-based or polyurethane-based, ink layer 17 may comprise, for example, an acrylic ink, a polyester ink or a polyurethane ink, respectively.

If desired, a first portion of ink layer 17 may be formed by screen printing, gravure printing or flexographic printing, and a second portion of ink layer 17 may be formed by thermal transfer printing, ink jet printing, laser printing or the like. For example, said first portion of ink layer 17 may be used to convey information that is constant for a plurality of image forming laminates 13 while said second portion of ink layer 17 may be used to convey information that may vary from one image forming laminate 13 to another image forming laminate 13. For example, said first portion (or constant information) of ink layer 17 may be used to convey care instructions or a trademark for a class of clothing articles whereas said second portion (or variable information) of ink layer 17 may be used to convey information that is particular to a given label, or to a series of labels. Said second portion of ink layer 17 may contain human-readable information and/or machine-readable information, such as bar codes. Examples of information that may be included in said second portion of ink layer 17 include: (a) serial numbers uniquely identifying each label; (b) product characteristics, such as the size of each such article of clothing (e.g., S, M, L, etc.), style, fiber type, etc.; (c) pricing information; (d) identification or location of the manufacturer or distributor; and (e) authenticity information.

In this manner, the first portion (or constant information) of ink layer 17 may be applied by the label manufacturer, and the second portion (or variable information) of ink layer 17 may be applied thereafter by an industrial user of the label (sometimes called a label converter; for example, a clothing manufacturer) just prior to label transfer. As a result, custom labels may be produced, and the amount of label stock that must be kept on hand by the manufacturer can be significantly decreased. More generally, however, the first portion of ink layer 17 can be imprinted in-line with the second portion of ink layer 17; the second portion of ink layer 17 can be imprinted at the same location but with a different printing line used to form the first portion of ink layer 17; or the first and second portions of ink layer 17 can be imprinted at different locations, typically by different manufacturers.

As noted above, the legibility of matter printed on support 15 is largely a function of the surface roughness of support 15. Consequently, if the printing surface of support 15 has a surface roughness of greater than about 15 microns, the print quality tends to be rather poor. (This problem of legibility is exacerbated where thermal transfer printing or the like is used to print the marking since the thickness of a marking made by such techniques is on the order of 1 micron.) Therefore, the surface roughness of support 15 is preferably no greater than about 10 microns and is more preferably about 5 microns if one wishes to print graphics (as opposed to text) or text of small lettering. Accordingly, for applications where high resolution is required, the PVC-based support described above is preferably used, said PVC-based support having a surface roughness of less than 1 micron. By contrast, where such high resolution is not required, another support having a surface roughness of about 6-10 microns may be used.

It should be understood that, although, for ease of illustration, ink design layer 17 is shown in FIG. 1 (and elsewhere in the drawings of the present application) as a continuous layer on image support 15, ink layer 17 is typically not in the form of a continuous layer, but rather, is typically in the form of a plurality of discrete elements making up the desired image and/or text of the label.

As can readily be appreciated, image forming laminate 13 could additionally or alternatively include an inventory control mechanism or a security feature (anti-theft, anti-counterfeiting, anti-parallel imports) in the form of one or more security materials (such as inks and additives) incorporated into ink layer 17 and/or image support 15. Security materials may comprise or be added to a single layer of the label or may comprise multiple layers of the label which interact to provide a security indication. Readily apparent (or "overt") security indicators are generally preferred to covert security.

Security inks include, but are not limited to, IR-activatable inks, UV-activatable inks, visible light-activatable inks, heat-activatable inks, electrically-activatable inks, magnetically-activatable inks, chemically-activatable inks, humidity-activatable inks, pressure-activatable inks, dichroic inks, and time-controlled inks.

Security additives include, for example, microscopic tracer particles (or "taggants") that may be incorporated into a layer of the label. Certain molecules can be coded by their physical material composition, color, alpha-numeric characters and other methods. An electronic reader would be used to verify the molecular composition in the label.

Figure 2:
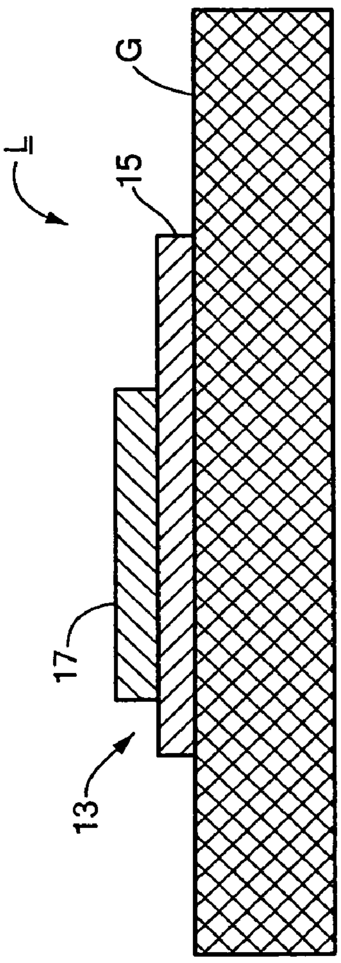
FIG. 2 is a schematic section view of a labeled garment formed by bonding the image forming laminate of the label assembly of FIG. 1 to a garment.

Referring now to FIG. 2, there is shown schematically a labeled garment L formed using image forming laminate 13. Garment G may be made of one or more fabrics, such fabrics being formed from natural or synthetic materials (e.g., cotton, nylon, polyester, rayon, Lycra, Spandex or combinations thereof); alternatively, garment G may be made of non-fabric materials, such as leather or the like. To form labeled garment L, one places image support 15 directly on top of garment G, with ink layer 17 facing upwardly away from garment G. Where image support 15 is heat-activatable, image support 15 is then bonded to garment G by pressing laminate 13 down against the garment G while applying heat downwardly towards ink layer 17 and image support 15 until image support 15 bonds to garment G. Preferably, the aforementioned application of heat and pressure to image forming laminate 13 is effected using conventional heat-transfer equipment. For example, one may use an Avery Dennison Heat Transfer Bonder Model No. 79200-00-3 set at 40-60 psi at 400° F. for 2 seconds.

The present inventors have noted that, when image forming laminate 13 is used to decorate fabrics, a good degree of label adherence and abrasion resistance is achieved. For example, once applied to fabric, the image forming laminate 13 can be stretched with its associated fabric beyond its original size and can go through numerous washing cycles without breaking down significantly or losing image quality. In addition, image forming laminate 13 forms a smooth surface on the fabric article, without any puckering on the article, and results in a "soft-feeling" label to the touch. Furthermore, image forming laminate 13 does not leave a visually discernible residue on the fabric, thereby affording a "no-label-look" to the labeled article.

Moreover, image forming laminate 13 can be applied to an article in a matter of a few seconds or less and does not require any post-application processing. Consequently, image forming laminate 13 permits virtually continuous labeling of a plurality of articles, thereby resulting in greater throughput than is possible with existing label constructions.

It should be understood that, although image forming laminate 13 is shown in FIG. 2 being bonded to a garment G, image forming laminate 13 may be bonded to other types of articles, such as glass, ceramic, paper, wood, metal, metal oxide, and/or plastic articles, provided that the particular material used as image support 15 is bondable to such an article.

Referring back now to FIG. 1, image removing laminate 14 comprises a remover support 19 and a remover layer 21, remover layer 21 being positioned directly on top of remover support 19. (It should be noted that, even though remover support 19 and remover layer 21 are shown in FIG. 1 having matching sizes, it is not necessary that remover support 19 and remover layer 21 have such matching sizes; instead, remover support 19 may have a periphery extending beyond that of remover layer 21 or vice versa. In fact, if desired, one may space apart at regular intervals a plurality of remover layers 21 on an elongated common web of support 19.)

For reasons to become apparent below, remover support 19 must be capable of providing structural support to remover layer 21, as well as being resistant to tearing and stable to the conditions of heat and/or light activation to which image removing laminate 14 is typically exposed. Materials suitable for use as remover support 19 include polyethylene terephthalate (PET) films, oriented polypropylene films (particularly heat-stabilized, oriented polypropylene films), polymer-coated paper substrates, metal foils (e.g., aluminum foil, stainless steel foil), metallized plastic films and fabrics. Where remover layer 21 is activated by applying heat to support 19 (which, thereafter transmits said heat to layer 21), support 19 preferably has a thickness of about 10 to 200 microns, more preferably 25 to 75 microns.

Remover layer 21, which preferably has a thickness of about 2 to 200 microns, more preferably 5 to 50 microns, may be formed from any material that is compatible with remover support 19, that adheres well to support 19 and that, upon being activated with heat (preferably at typical heat-transfer temperatures) and/or light and pressed into contact with ink layer 17 of image forming laminate 13, adheres well to ink layer 17. In particular, as will be discussed further below, once activated and contacted with ink layer 17, remover layer 21 must adhere more strongly to remover support 19 and to ink layer 17 than ink layer 17 adheres to support 15 or than support 15 adheres to the labeled article. In this manner, one may bond image removing laminate 14 to image forming laminate 13 and then, by peeling image removing laminate 14 away from the article, remove either ink layer 17 or both ink layer 17 and support 15 from the underlying article.

Where ink layer 17 is formed, for example, using a PVC ink or a thermal transfer ink, remover layer 21 may comprise, for example, a PVC resin, a polyester resin, a polyurethane resin, a polyamide resin, or an acrylic resin. (Where ink layer 17 is formed using an acrylic ink, a polyester ink or a polyurethane ink, remover layer 21 may comprise, for example, an acrylic resin, a polyester resin or a polyurethane resin, respectively.) An example of a suitable composition for use in forming such a remover layer 21 comprises 50 parts Sancure 835 polyurethane resin (Noveon Corp., Cleveland, Ohio), 0.5 parts Tafigel PUR 61 thickener (Ultra Additives, Clover, S.C.), and 0.2 parts Dehydran 1620 defoamer (Cognis Corp., Ambler, Pa.). Another example of a suitable composition for use in forming remover layer 21 comprises 50 parts Sancure 835 polyurethane resin (Noveon Corp., Cleveland, Ohio), 0.5 parts Tafigel PUR 61 thickener (Ultra Additives, Clover, S.C.), 0.2 parts Dehydran 1620 defoamer (Cognis Corp., Ambler, Pa.) and 1 part CX-100 crosslinker (NeoResins, Wilmington, Mass.).

Remover layer 21 may be formed by printing a composition of the type described above onto support 19, preferably by screen printing, and then heating the printed product or allowing any volatile component(s) of the printed layer to evaporate, leaving only the non-volatile component(s) to form layer 21.

Figure 3A:
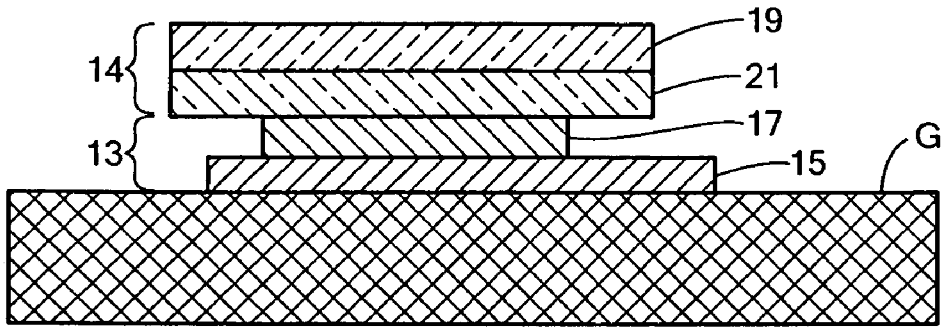
FIGS. 3(*a*) and 3(*b*) are schematic section views showing how the image removing laminate of FIG. 1 may be bonded to the labeled garment of FIG. 2 and used to remove the image forming laminate from the garment.
Figure 3B:
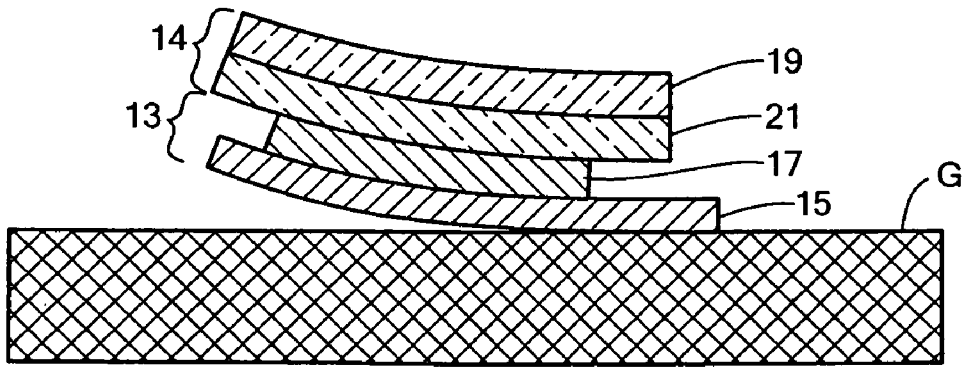

Referring now to FIGS. 3(*a*) and 3(*b*), there is shown schematically the manner in which image removing laminate 14 may be used to remove image forming laminate 13 from a garment G to which it has been bonded. First, as seen in FIG. 3(*a*), image removing laminate 14 is positioned relative to the labeled article so that remover layer 21 is placed directly on top of ink layer 17 of image forming laminate 13, with remover support 19 facing upwardly away from ink layer 17. Next, while image removing laminate 14 is pressed downwardly against image forming laminate 13, remover layer 21 is activated. Where remover layer 21 is activatable by heat, such activation may be effected, for example, by applying heat to the top of remover support 19 until sufficient heat is transmitted by remover support 19 to layer 21 so as to cause layer 21 to be activated. (Preferably, the aforementioned application of heat and pressure to image removing laminate 14 is effected using conventional heat-transfer equipment, such as Avery Dennison Heat Transfer Bonder Model No. 79200-00-3 set at 40-60 psi at 400° F. for 2 seconds.) The result of the aforementioned activation of remover layer 21 is the bonding of remover layer 21 to ink layer 17 and to image support 15. Finally, as seen in FIG. 3(*b*), the peeling away of image removing laminate 14 from garment G causes ink layer 17 and image support 15, both of which are now adhered to image removing laminate 14, also to be peeled away from garment G.

It should be noted that, even though in the embodiment shown in FIG. 3(*b*), image removing laminate 14 results in the complete removal of image forming laminate 13 from garment G, it is not necessary that the entirety of image support 15 be removed from garment G (provided that the entire label image is located in ink layer 17, and not at all in image support 15). In such a case, all that is minimally necessary is that ink layer 17 be removed from garment G, with a portion or all of image support 15 possibly remaining on the garment G.

One advantage to using image removing laminate 14 to remove image forming laminate 13 from an article, as compared to using the strips of pressure-sensitive tape described above, is that image removing laminate 14 need not be used within about ten minutes of label transfer, but rather, may be used at any time.

Figure 4:
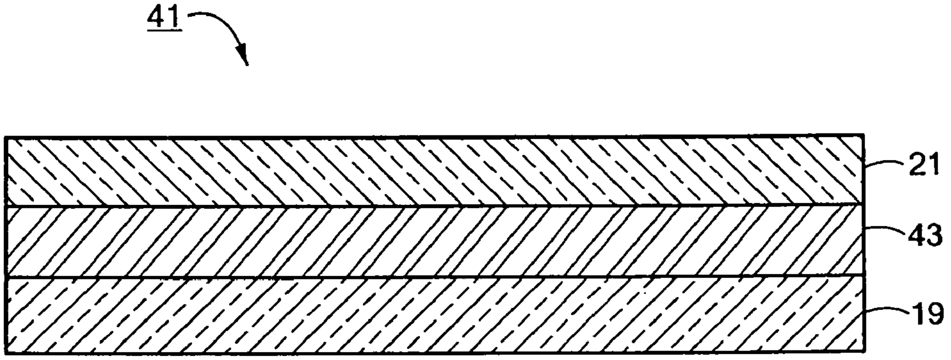
FIG. 4 is a schematic section view of an alternative embodiment to that shown in FIG. 1 of an image removing laminate.

Referring now to FIG. 4, there is shown a schematic section view of an alternative embodiment of an image removing laminate, said image removing laminate being constructed according to the teachings of the present invention and represented generally by reference numeral 41.

Image removing laminate 41 is similar in many respects to image removing laminate 14, both laminates including a remover support 19 and a remover layer 21. The principal difference between image removing laminate 41 and image removing laminate 14 is that image removing laminate 41 further includes a tie layer 43 interposed between remover support 19 and remover layer 21, tie layer 43 serving the purpose of strengthening the adhesion between remover support 19 and remover layer 21. This may be desirable, for example, where, due to the composition of ink layer 17, a remover layer 21 of a particular composition is used that does not bond as strongly to remover support 19 as may be desired. For example, where ink layer 17 is PVC-based, remover layer 21 is PVC-based and support 19 is a PET film, it may be desirable to use a polyurethane-based tie layer 43.

Tie layer 43, which may have a thickness of about 1 to 50 microns, preferably 2 to 10 microns, may be formed by depositing, preferably by screen printing, a tie layer composition on top of support 19 and then heating the printed product or allowing the volatile component(s) of the printed layer to evaporate, leaving only the non-volatile component(s) to form layer 43. Remover layer 21 may then be formed by printing a remover layer composition onto tie layer 43 and then heating the resultant product or allowing any volatile component(s) of the printed layer to evaporate, leaving only the non-volatile component(s) to form layer 21.

It should be noted that, even though remover support 19, tie layer 43 and remover layer 21 are all shown in FIG. 4 to have matching peripheries, it is not necessary that all of the aforementioned layers have such matching peripheries. Instead, for example, one may space apart at regular intervals on an elongated common web of support 19 a plurality of remover layers 21 and tie layers 43 having matching or non-matching peripheries.

Image removing laminate 41 may be used in the same manner as image removing laminate 14.

Figure 5:
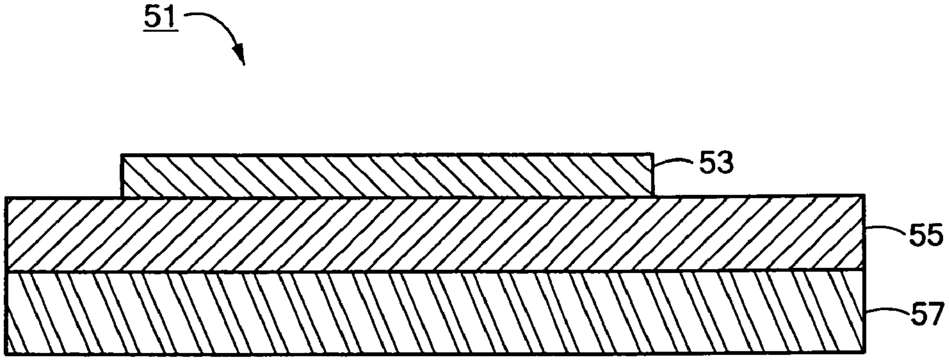
FIG. 5 is a schematic section view of a first alternative embodiment to that shown in FIG. 1 of an image forming laminate.

Referring now to FIG. 5, there is shown a schematic section view of a first alternative embodiment of an image forming laminate, said image forming laminate being constructed according to the teachings of the present invention and represented generally by reference numeral 51.

Image forming laminate 51 comprises an ink layer 53, an image support 55 and an adhesive layer 57. Ink layer 53 is identical to ink layer 17 of image forming laminate 13. Image support 55 is similar in many respects to image support 15 of image forming laminate 13 but, due to the presence of adhesive layer 57, is not limited to materials that are activatable by heat (at typical heat-transfer temperatures) and/or light so as to be directly bondable to articles. Consequently, many of the heat-stable materials suitable for use as remover support 19 may also be suitable for use as image support 55.

Adhesive layer 57, which preferably has a thickness of about 10 to 200 microns, comprises a material that, upon activation with heat (preferably at typical heat-transfer temperatures) and/or light, is directly and durably bondable to a desired article while, at the same time, remaining durably bonded to support 55. Depending upon the type of article to be labeled, examples of suitable adhesives may include PVC-based adhesives, acrylic-based adhesives, polyester-based adhesives, polyurethane-based adhesives and polyamide-based adhesives. One example of a suitable adhesive composition for use in forming adhesive layer 57, where image forming laminate 51 is used to label fabric articles, comprises 450 parts HMP 5184 V polyester powder resin (Bostik-Findley, Middleton, Mass.) as an adhesive, 150 parts PKHW 35 phenoxy dispersion (InChem Corp., Rock Hill, S.C.) as a binder, 110 parts Tafigel PUR 61 thickener (Ultra Additives, Inc., Clover, S.C.), 12 parts Dehydran 1620 defoamer (Cognis Corp., Ambler, Pa.), 6 parts Zonyl FSA wetting agent (DuPont, Wilmington, Del.), and 1800 parts water. Another example of a suitable adhesive composition for use in forming adhesive layer 57, where image forming laminate 51 is used to label fabric articles, comprises 100 parts Geon 137 PVC resin (PolyOne, Avon Lake, Ohio), 55 parts Santicizer 160 plasticizer (Ferro, Cleveland, Ohio), 55 parts dioctyl phthalate plasticizer (ChemCentral, Bedford Park, Ill.) and 47 parts Griltex 4AP1 adhesive (Griltech, Sumter, S.C.).

Adhesive layer 57 is preferably formed by depositing, by screen printing or the like, onto the bottom of support 55 a suitable adhesive composition and then evaporating any volatile component(s) of the composition, leaving only the non-volatile solid component(s) thereto to form layer 57. Preferably, the peripheries of support 55 and adhesive layer 57 are identical (as shown in FIG. 5), but they need not be so.

Image forming laminate 51 may be applied to an article and, thereafter, removed therefrom in the same manner as image forming laminate 13. As noted above in connection with image forming laminate 13, although it is preferred that image removing laminate 14 or image removing laminate 41 be capable of removing the entirety of image forming laminate 51 from an article, it is not essential that the entirety of image forming laminate 51 be removed. Instead, provided that the entire label image is located within ink layer 53, it is sufficient if ink layer 53 is removed from the article, with a portion or all of support 55 and/or adhesive layer 57 possibly remaining adhered to the article.

Figure 6:
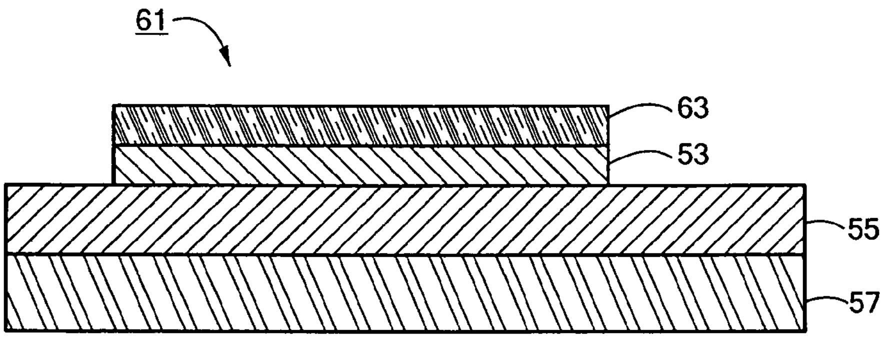
FIG. 6 is a schematic section view of a second alternative embodiment to that shown in FIG. 1 of an image forming laminate.

Referring now to FIG. 6, there is shown a schematic section view of a second alternative embodiment of an image forming laminate, said image forming laminate being constructed according to the teachings of the present invention and represented generally by reference numeral 61.

Image forming laminate 61 is similar in most respects to image forming laminate 51, the principal difference between the two image forming laminates being that image forming laminate 61 further comprises a protective layer 63 deposited directly on top of ink layer 53 to protect ink layer 53 from scuffing and laundering conditions. Protective layer 63, which preferably has a thickness of about 2 to 50 microns, more preferably 2 to 10 microns, may be formed from a wide variety of different resins, both water-based and solvent-based, provided that the resultant layer 63 possesses an acceptable degree of abrasion resistance and an acceptable degree of adhesion to ink layer 53. A preferred formulation from which protective lacquer layer 63 may be printed includes a combination of a high $T_g$ solvent-based phenoxy resin, such as PKHH phenoxy resin (InChemRez Inc., Rock Hill, S.C.), and a low $T_g$ solvent-based polyurethane resin, such as Estane 5715 polyurethane resin (Noveon, Inc., Cleveland, Ohio), such resins preferably being combined in a 1 to 3 ratio with an organic solvent, such as cyclohexanone and/or a dibasic ester (e.g., dimethyl adipate). In addition, an adhesion promoter, such as NB 80 polymeric aliphatic isocyanate adhesion promoter (Nazdar Ink, Shawnee, Kans.), is preferably included in the formulation to enhance printing quality, said adhesion promoter being present in an amount constituting about 0 to 10%, by weight, more preferably 2 to 8%, by weight. A small amount (less than 1%) of a surfactant, e.g., Zonyl FSO fluorosurfactant (DuPont, Wilmington, Del.), may also be added to the formulation prior to printing. Another suitable material for use as protective layer 63 may be an acrylic-based material, a polyester-based material or a PVC-based material. Wax may be added to protective layer 63 to improve scuff resistance.

Where laminate 61 is used as a permanent care label for garments, the aforementioned combination of a low $T_g$ polyurethane polymer and a high $T_g$ phenoxy polymer is particularly desirable as it results in a medium $T_g$ mixture that provides a "soft" feeling with the right polymer modulus that prevents the label construction from blocking when the label construction is manufactured as a self-wound roll.

Another preferred formulation from which protective layer 63 may be printed includes 100 parts Nazdar 9627 clear overprint varnish (Nazdar Ink, Shawnee, Kans.) and 5 parts NB 80 adhesion promoter.

Other suitable protective layers 63 may be found in the following patents, all of which are incorporated herein by reference: U.S. Pat. Nos. 5,800,656; 6,033,763; 6,083,620; and 6,099,944.

To form protective lacquer layer 63, a lacquer dispersion or solution of the type described above is deposited onto a desired area of ink layer 53, preferably by screen printing, gravure printing, flexographic printing or a similar technique. (Considerations relevant in deciding whether to use screen printing, gravure printing or flexographic printing to print a given layer, such as lacquer layer 63, include the particle size of the composition to be printed and the thickness of the layer one wishes to print. Screen printing is most suitable for compositions having a larger particle size (i.e., as great as about 100-200 microns) and where a thicker layer is desired (i.e., about 5-200 microns). Gravure printing is most suitable for compositions having a smaller particle size (i.e., no more than a micron or two) and where a thinner layer is desired (i.e., about 1-2 microns). Flexographic printing is suitable for compositions having a particle size of no more than several microns and where a thin layer of about 1-10 microns is desired.)

After deposition of the lacquer composition onto the desired area of layer 53, the volatile component(s) of the composition evaporate(s), leaving only the non-volatile components thereof to make up lacquer layer 63.

It should be noted that, although the periphery of protective layer 63 is shown in FIG. 6 as matching that of ink layer 53, the periphery of protective layer 63 could alternatively match that of support layer 55.

Image forming laminate 61 may be applied to an article and, thereafter, removed therefrom in the same manner as image forming laminate 13.

Figure 7:
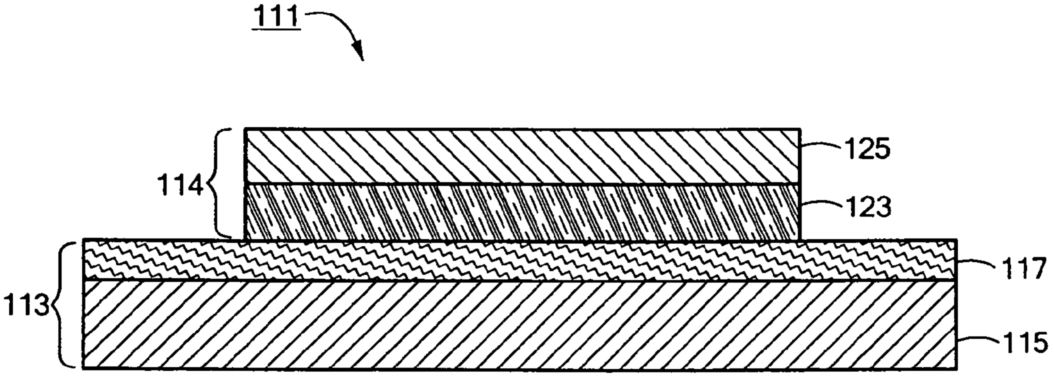
FIG. 7 is a schematic section view of a third alternative embodiment to that shown in FIG. 1 of an image forming laminate.

Referring now to FIG. 7, there is shown a schematic section view of a third alternative embodiment of an image forming laminate, said image forming laminate being constructed according to the teachings of the present invention and represented generally by reference numeral 111.

Image forming laminate 111 comprises a support portion 113 and a transfer portion 114, transfer portion 114 being releasably mounted on support portion 113 so as to be transferable from support portion 113 to an article by pressing transfer portion 114 of laminate 111 against the article while applying heat and/or light to transfer portion 114.

Support portion 113, in turn, comprises a carrier 115. Carrier 115 may be a paper substrate, a polymer-coated paper substrate, or a polymer film substrate. Preferably, carrier 115 is a polymer film substrate having a glass transition temperature in the range of 60° C. to 250° C. and having a storage modulus in the range of $1.0\times10^{10}$ dynes/cm$^2$ to $2.0\times10^{10}$ dynes/cm$^2$ at ambient temperature and a storage modulus in the range of $5.0\times10^7$ to $1.5\times10^{10}$ dynes/cm$^2$ at 100° C. Examples of materials particularly preferred for use as carrier 115 include polyester films, particularly polyethylene terephthalate (PET) films and poly(ethylene 2,6-naphthalene dicarboxylate) (PEN) films, and oriented polypropylene films.

More preferably, carrier 115 is a plastic film of the type described above that is additionally optically clear. As can readily be appreciated, one benefit to using a clear material as carrier 115 is that, if desired, one can inspect the quality of the printed matter of the laminate by looking at said printed matter through carrier 115 (from which perspective said printed matter appears as it will on the labeled article), as opposed to looking at said printed matter through transfer portion 114 of laminate 111 (from which perspective said printed matter appears as the mirror image of what will appear on the labeled article).

Carrier 115 preferably has a thickness of about 0.5-7 mil, more preferably about 0.9-3.0 mil, even more preferably about 1.4-2 mil.

Support portion 113 also includes a release layer or coating 117, coating 117 preferably being applied directly to the top of carrier 115. Coating 117 is a release material that preferably separates cleanly from transfer portion 114 of laminate 111 and is not transferred, to any visually discernible degree, with transfer portion 114 onto an article being labeled. (For purposes of the present specification and claims, the term "visually discernible" is to be construed in terms of an unaided or naked human eye.) Moreover, in addition to separating cleanly from transfer portion 114 of laminate 111, coating 117 preferably permits the separation of transfer portion 114 from coating 117 soon (i.e., within a few seconds) after transfer portion 114 has been applied to an article. Preferably, release coating 117 is clear for the same types of reasons given above in connection with carrier 115.

Coating 117 preferably has a thickness of about 0.01 to 10 microns, more preferably about 0.02 to 1 micron, even more preferably about 0.1 micron.

Preferably, coating 117 and carrier 115 are selected so that the release force required to peel a unit width of pressure sensitive tape from coating 117 at 180 degrees is in the range of about 0.5-5.0 lb/inch, more preferably about 1.5-3.5 lb/inch, even more preferably about 2.1-2.4 lb/inch. For purposes of the present specification and claims, the release force required to peel a unit width of pressure sensitive tape from coating 117 at 180 degrees is determined in accordance with Adhesion Test Method PSTC-4B, which is described in *Test Methods for Pressure Sensitive Adhesive Tapes*, 13$^{th}$ Edition, published by Pressure Sensitive Tape Council, Northbrook, Ill. (2000), and which is incorporated herein by reference.

A variety of different substances may be applied to carrier 115 to form coating 117. One such substance is an olefinic material that does not contain any waxes or any silicones, except to the limited extent provided below. (The terms "non-wax" and "non-silicone," when used in the present specification and claims to describe or to define a release layer or coating formed from such a substance, are defined herein to exclude from said release layer or coating the presence of any and all waxes and silicones not encompassed by the limited exceptions provided below.) The coating formed from said olefinic substance has a total surface energy of about 25 to 35 mN/m (preferably about 30 mN/m), of which about 0.1 to 4 mN/m (preferably about 1.3 mN/m) is polar surface energy. When analyzed by XPS (X-ray photoelectron spectroscopy), said coating has a carbon content (by atomic %) of about 90 to 99.9% (preferably about 97%) and an oxygen content (by atomic %) of about 0.1 to 10% (preferably about 3%). Examples of a support portion 113 that includes a carrier 115 and a coating 117 as described above are commercially available from DuPont Teij in Films (Hopewell, Va.) as Mylar® A701-142 gauge film and Mylar® A701-200 gauge film. The release force required to peel, at 180 degrees, a unit width of pressure sensitive tape from coating 117 of Mylar® A701-142 gauge film is 2.117 lb/inch and from coating 117 of Mylar® A701-200 gauge film is 2.4 lb/inch.

Because it is common to wind a continuous web of heat-transfer labels into a roll, one advantage to using a non-wax, non-silicone release coating of the type described above in a heat-transfer label construction is that there is no chance of the release coating contaminating transfer portion 114 with wax or silicone. This may be a substantial benefit as the transfer of a wax or silicone residue onto transfer portion 114 may adversely affect the adhesive properties of transfer portion 114 layer during label transfer.

Another advantage of a non-wax release coating over a wax release coating is that a non-wax release coating is typically capable of being used over a broader range of operating temperatures than is a wax release coating, which typically must be heated to its melting temperature.

Another advantage of a non-silicone release coating over a silicone release coating is that a non-silicone release coating typically has better printability than does a silicone release coating.

Notwithstanding the above, instead of being formed from the non-wax, non-silicone, olefinic substance described above, release coating 117 may comprise a phosphate ester coating, such as RA-150W release coat (Mayzo, Inc., Norcross, Ga.), a carbamate coating, a silicone coating, a fluorocarbon coating or a wax coating, such as a polyethylene-based wax coating of the type described below.

Still other types of coated polymer films which may be used as support portion 113 are described in PCT Application No. PCT/US00/17703, which was published on Jan. 18, 2001, and in European Patent Application No. 819,726, published Jan. 21, 1998, both of which are incorporated herein by reference. Both of the aforementioned patent applications teach a coated film structure preferably comprising:

(i) polymers selected from the group consisting of polyesters such as polyethylene terephthalate and poly(ethylene 2,6-naphthalene dicarboxylate); polyolefins such as polyethylene and polypropylene; and polyamides; wherein said polymers form a polymeric film surface; and (ii) a primer coating comprising:

(A) functionalized α-olefin containing copolymers, preferably acid functionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc. and (B) crosslinking agents selected from the group consisting of amino formaldehyde resins, polyvalent metal salts, isocyanates, blocked isocyanates, epoxy resins and polyfunctional aziridines;

(iii) wherein said primer coating is applied as a primer to the polymeric film surface, preferably in its amorphous or semi-oriented state and reacted with newly generated polymeric film surfaces formed during uniaxial or biaxial stretching and heat setting.

Another example of a suitable support portion 113 may be found in U.S. Pat. No. 6,423,406, which is incorporated herein by reference.

Additives such as coating aids, wetting aids such as surfactants (including silicone surfactants), slip additives, antistatic agents may be incorporated into release coating 117 in levels from 0 to 50% based on the total weight of additive-free coating solids.

The above-described release coating 117 may additionally be applied to the bottom surface of the polymeric carrier 115 for use in preventing transfer portion 114 from adhering to the underside of carrier 115 when a label assembly comprising a plurality of transfer portions on a single support portion 113 is wound into a roll.

Transfer portion 114, in turn, preferably includes (i) a protective layer 123 printed directly on top of a desired area of release layer 117 and (ii) an ink layer 125 printed directly onto protective layer 123. Preferably, the periphery of ink layer 125 matches that of protective layer 123. (It should be understood that, even though only a single transfer portion 114 is shown on a slightly oversized support portion 113 in FIG. 7, one need not position only one transfer portion 114 per support portion 113, but rather, one may space apart at regular intervals a plurality of identical or different transfer portions 114 on an elongated common web of support portion 113).

Protective layer 123, which preferably has a thickness of about 2 to 50, more preferably 2 to 10 microns, may be formed from a wide variety of different resins, provided that the resultant layer 123 possesses an acceptable degree of scuff resistance and, where transfer portion 114 is applied to garments or other articles subjected to laundering, is capable of protecting ink layer 125 satisfactorily from such laundering conditions. In addition, to permit highly legible printing thereonto, the surface roughness of protective layer 123 preferably should not exceed more than about 15 microns. Furthermore, in order to permit transfer portion 114 to be removed from an article to which it has been transferred using image removing laminate 14 or image removing laminate 41, protective layer 123 should bond more strongly to ink layer 125 and be more strongly bondable to remover layer 21 than ink layer 125 bonds to the article being labeled. Where, for example, laminate 111 is used to label fabric articles and ink layer 125 comprises a PVC-based ink or a thermal transfer ink, protective layer 123 may comprise, for example, a polyurethane resin, a PVC resin, or a phenoxy resin. Alternatively, where ink layer 125 comprises an acrylic-based ink, a polyester-based ink or a polyurethane-based ink, protective layer 123 may comprise, for example, an acrylic resin, a polyester resin or a polyurethane resin, respectively. Protective layer 123 may additionally include wax to enhance its scuff resistance. An example of a suitable composition for use in forming protective layer 123 includes 100 parts Geon 137 PVC resin (PolyOne, Cleveland, Ohio), 55 parts Santicizer 160 benzyl butyl phthalate plasticizer (Ferro, Cleveland, Ohio) and 55 parts dioctyl phthalate plasticizer (ChemCentral, Bedford Park, Ill.).

Protective layer 123 may be formed by printing, preferably by screen printing, a suitable protective layer composition onto one or more desired areas of release layer 117 and, thereafter, allowing any volatile component(s) of the ink composition(s) to evaporate, leaving only the non-volatile ink components to form layer 123.

Ink layer 125 of transfer portion 114, which layer may actually comprise either a single ink layer or a plurality of ink layers, may be formed from one or more of a wide variety of different inks, provided that the resultant layer 125 possesses an acceptable degree of adhesion to protective layer 123 and is directly bondable, upon being activated by heat (preferably at typical heat-transfer temperatures) and/or light, to the article to be labeled. For example, where the article to be labeled is a garment or similar article of fabric, ink layer 125 may be, for example, a PVC-based ink. An example of a suitable ink composition for use in forming ink layer 125 comprises 720 parts Geon 137 PVC resin (PolyOne Corporation, Avon Lake, Ohio), 350 parts Santicizer 160 benzyl butyl phthalate plasticizer (Ferro, Cleveland, Ohio), 350 parts dioctyl phthalate plasticizer (ChemCentral, Bedford Park, Ill.), 140.4 parts Violet PC colorant (PolyOne Corporation, Avon Lake, Ohio), 77.4 parts Blue PC colorant (PolyOne Corporation, Avon Lake, Ohio) and 25.2 parts Bright Yellow PC colorant (PolyOne Corporation, Avon Lake, Ohio). Other suitable inks may include thermal transfer inks, ink jet inks, laser toners, polyester inks, polyurethane inks and acrylic inks.

Ink layer 125, which preferably has a thickness of about 0.1 to 30 microns, more preferably about 1 to 20 microns, is formed by printing one or more ink compositions of the type described above onto lacquer layer 123 and, thereafter, allowing any volatile component(s) of the ink composition(s) to evaporate, leaving only the non-volatile ink components to form layer 125. In the case of the above-described PVC-containing ink, there are no such volatile components, but the printed layer must be heated, typically in an IR or UV oven, to fuse, gel, or "cure" the layer.

As discussed above in connection with ink layer 17, ink layer 125 may comprise a first portion and a second portion wherein said first portion is formed by screen printing, gravure printing or flexographic printing and is directed to constant information and wherein said second portion is formed by thermal transfer printing, laser printing or ink jet printing and is directed to variable information. In this manner, custom labels may be produced.

It should be understood that image forming laminate 111 could additionally or alternatively include an inventory control mechanism or a security feature (anti-theft, anti-counterfeiting, anti-parallel imports) in the form of one or more security materials (such as a security ink or a security additive of the type described above) incorporated into ink layer 125 and/or protective layer 123.

Figure 8A:
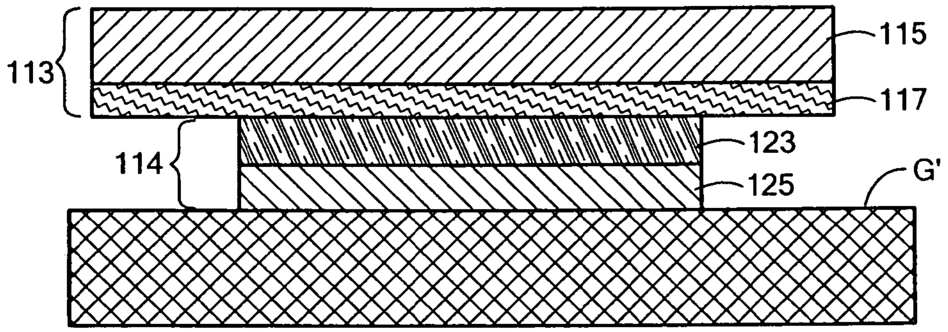
FIGS. 8(*a*) and 8(*b*) are schematic section views showing how the image forming laminate of FIG. 7 may be used to label an article.
Figure 8B:
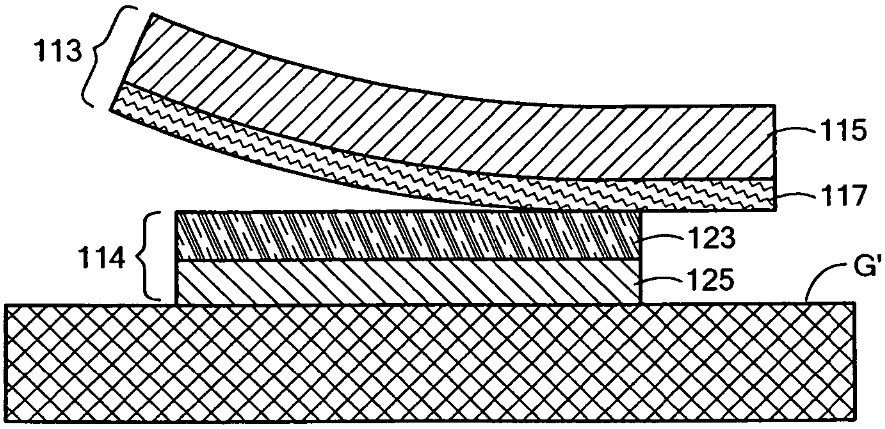

Referring now to FIGS. 8(*a*) and 8(*b*), there is shown the manner in which image forming laminate 111 may be used to label an article, such as a garment G'. Garment G' may be made of one or more fabrics, such fabrics being formed from natural or synthetic materials (e.g., cotton, nylon, polyester, rayon, Lycra, Spandex or combinations thereof); alternatively, garment G' may be made of non-fabric materials, such as leather or the like. As seen in FIG. 8(*a*), one first places laminate 111 against garment G', with ink layer 125 of transfer portion 114 directly contacting garment G' and carrier 115 facing away from garment G'. Where ink layer 125 becomes bondable via heat-activation, laminate 111 is pressed firmly against garment G' while heat is applied down through support portion 113 to ink layer 125 until ink layer 125 bonds to garment G'. Preferably, the aforementioned application of heat and pressure to image forming laminate 111 is effected using conventional heat-transfer equipment, such as an Avery Dennison Heat Transfer Bonder Model No. 79200-00-3 set at 40-60 psi at 400° F. for 2 seconds. As seen in FIG. 8(*b*), with ink layer 125 thus bonded to garment G', support portion 113 is then peeled away, leaving only transfer portion 114 on garment G'.

One can adjust the type of finish transfer portion 114 exhibits on the labeled article either by peeling support portion 113 from transfer portion 114 immediately after transfer ("hot release") to yield a matte finish or by peeling support portion 113 from transfer portion 114 after a short cooling period following transfer to yield a glossy finish.

The present inventors have noted that, when laminate 111 is used to decorate fabric articles, a good degree of label adherence and abrasion resistance can be achieved. For example, once applied to fabric, transfer portion 114 can be stretched with its associated fabric beyond its original size and can go through numerous washing cycles without breaking down significantly or losing image quality. In addition, laminate 111 results in transfer portion 114 forming a smooth surface on the labeled article, without any puckering on the article, and results in a "soft-feeling" label to the touch. Furthermore, laminate 111 does not leave a visually discernible residue on the fabric, thereby affording a "no-label-look" to the labeled article.

Moreover, one of the advantages associated with laminate 111, as compared to existing heat-transfer labels for fabric, is that support portion 113 can be peeled away from transfer portion 114 soon (i.e., within a few seconds or less) after transfer portion 114 has been applied to fabric under conditions of heat and pressure.

Figure 9A:
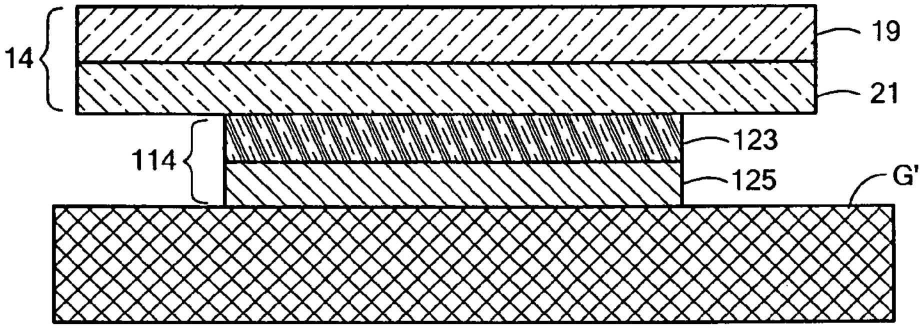
FIGS. 9(*a*) and 9(*b*) are schematic section views showing how the image removing laminate of FIG. 1 may be bonded to the labeled article of FIG. 8(*b*) and used to remove the label from the article.
Figure 9B:
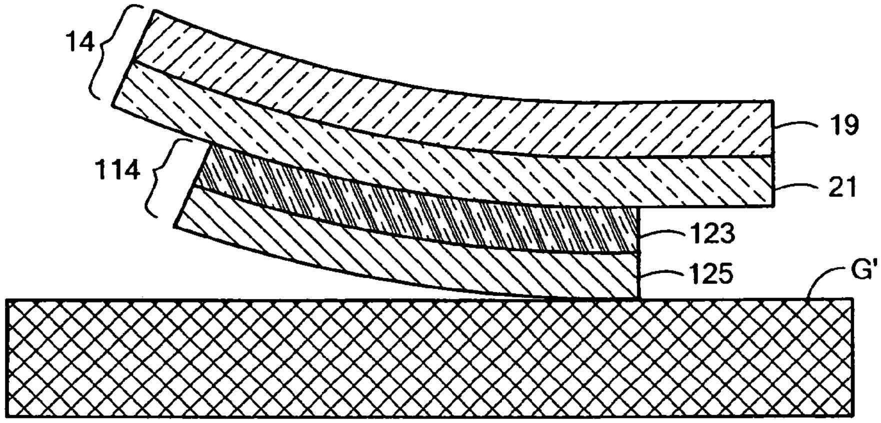

Referring now to FIGS. 9(*a*) and 9(*b*), there is shown schematically the manner in which image removing laminate 14 may be used to remove transfer portion 114 from garment G' to which it has been bonded. First, as seen in FIG. 9(*a*), image removing laminate 14 is positioned relative to the labeled article so that remover layer 21 is placed directly on top of protective layer 123, with remover support 19 facing upwardly away from protective layer 123. Next, while image removing laminate 14 is pressed downwardly against transfer portion 114, remover layer 21 is activated. Where remover layer 21 is activatable by heat, such activation may be effected, for example, by applying heat to the top of remover support 19 until sufficient heat is transmitted by remover support 19 to layer 21 so as to cause layer 21 to be activated. (Preferably, the aforementioned application of heat and pressure to image removing laminate 14 is effected using conventional heat-transfer equipment, such as an Avery Dennison Heat Transfer Bonder Model No. 79200-00-3 set at 40-60 psi at 400° F. for 2 seconds.) The result of the aforementioned activation of remover layer 21 is the bonding of remover layer 21 to protective layer 123. Finally, as seen in FIG. 9(*b*), the peeling away of image removing laminate 14 from garment G' causes protective layer 123 and ink layer 125, both of which are now adhered to image removing laminate 14, also to be peeled away from garment G'.

It should be noted that image removing laminate 14 need not be used within ten minutes after applying transfer portion 114 to garment G', but rather, may be used at any time after applying transfer portion 114 to garment G'.

It should also be noted that, instead of using image removing laminate 14 to remove transfer portion 114 from garment G', image removing laminate 41 may be used.

Figure 10:
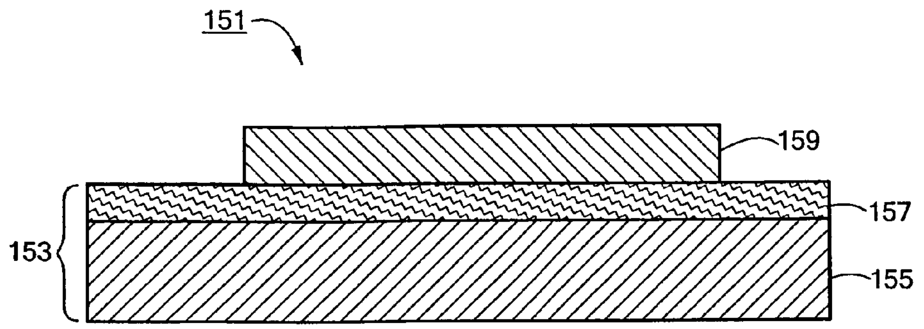
FIG. 10 is a schematic section view of a fourth alternative embodiment to that shown in FIG. 1 of an image forming laminate.

Referring now to FIG. 10, there is shown a schematic section view of a fourth alternative embodiment of an image forming laminate, said image forming laminate being constructed according to the teachings of the present invention and represented generally by reference numeral 151.

Laminate 151 comprises a support portion 153, support portion 153 comprising a carrier 155 and a release layer 157. Carrier 155 is identical to carrier 115 of laminate 111, and release layer 157 is identical to release layer 117 of laminate 111.

Laminate 151 further comprises an ink layer 159 printed directly onto a desired area of release layer 157 (it being understood that, even though only a single ink layer 159 is shown in FIG. 10, one need not position only one ink layer 159 per support portion 153, but rather, one may space apart at regular intervals a plurality of identical or different ink layers 159 on an elongated common web of support portion 153.)

Ink layer 159, which may actually comprise either a single ink layer or a plurality of ink layers, may be formed from one or more of a wide variety of different inks, provided that the resultant layer 159 releases acceptably from support portion 153 and is directly bondable, upon being activated by heat (preferably at typical heat-transfer temperatures) and/or light, to the article to be labeled. Where, for example, the article to be labeled is a garment or similar article of fabric, ink layer 159 may be formed using, for example, a PVC-based ink of the type described above. Other suitable inks may include thermal transfer inks, ink jet inks, laser toners, polyester inks, polyurethane inks, and acrylic inks. Furthermore, in order to permit ink layer 159 to be removed from an article to which it has been transferred using image removing laminate 14 or image removing laminate 41, ink layer 159 should be more strongly bondable to remover layer 21 than to the article being labeled.

Preferably, ink layer 159 has a thickness of about 0.1 to 30 microns, more preferably about 1 to 20 microns, and is formed by printing one or more ink compositions of the type described above onto release layer 157 and, thereafter, allowing any volatile component(s) of the ink composition(s) to evaporate, leaving only the non-volatile ink components to form layer 159. Where ink layer 159 is formed using the above-described PVC-containing ink, there are no such volatile components, but the printed layer must be heated, typically in an IR or UV oven, to fuse, gel or "cure" the layer.

As discussed above in connection with ink layer 125, ink layer 159 may comprise a first portion and a second portion wherein said first portion is formed by screen printing, gravure printing or flexographic printing and is directed to constant information and wherein said second portion is formed by thermal transfer printing, laser printing or ink jet printing and is directed to variable information.

Image forming laminate 151 could additionally or alternatively include an inventory control mechanism or a security feature (anti-theft, anti-counterfeiting, anti-parallel imports) in the form of one or more security materials (such as a security ink or a security additive of the type described above) incorporated into ink layer 159.

Image forming laminate 151 may be applied to an article and, thereafter, removed therefrom in the same manner as image forming laminate 111.

One advantage of laminate 151 over laminate 111 is that the manufacturing process for producing laminate 151 is less involved than that for producing laminate 111, thereby resulting in a reduction of materials needed and in manufacturing time and expense. In addition, because laminate 151 does not include a protective layer, its transferred label (ink layer 159) has a reduced thickness or bulk as compared to transfer portion 114 of laminate 111, thereby making the transferred label of laminate 151 less irritating than the transferred label of laminate 111 to the skin of a wearer of a garment labeled therewith.

On the other hand, a disadvantage of laminate 151 relative to laminate 111 is that the lack of a layer between ink layer 159 and support portion 153 tends to cause the ink of ink layer 159 to diffuse during label transfer. As a result, the resolution of the image of ink layer 159 tends to be poorer than that of ink design layer 125. Consequently, ink layer 159 is not as well suited as ink layer 125 for printing images or lettering of small size.

Figure 11:
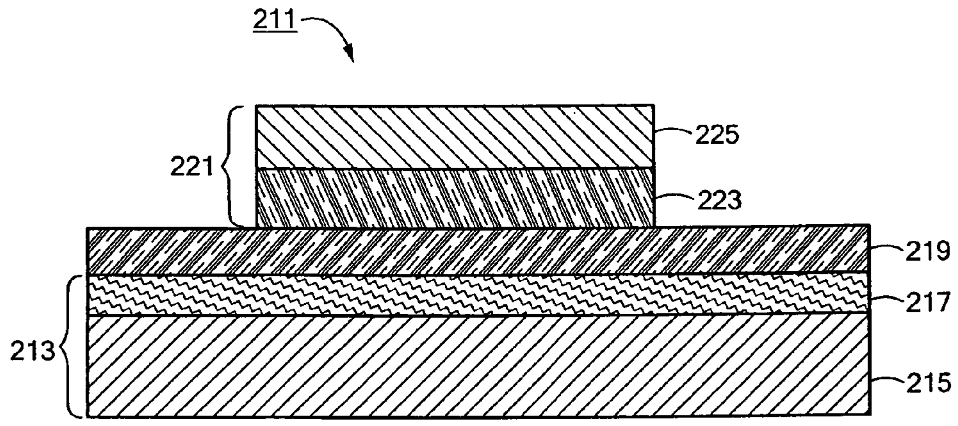
FIG. 11 is a schematic section view of a fifth alternative embodiment to that shown in FIG. 1 of an image forming laminate.

Referring now to FIG. 11, there is shown a schematic section view of a fifth alternative embodiment of an image forming laminate, said image forming laminate being constructed according to the teachings of the present invention and represented generally by reference numeral 211.

Laminate 211 comprises a support portion 213, support portion 213 comprising a carrier 215 and a release layer 217. Carrier 215 is identical to carrier 115 of laminate 111, and release layer 217 is identical to release layer 117 of laminate 111.

Laminate 211 also comprises a wax layer 219, wax layer 219 overcoating release layer 217 of support portion 213. Wax layer 219, which serves to facilitate the release of the transfer portion to be described below from support portion 213, preferably has a thickness of about 1 to 20 microns, more preferably about 4 to 15 microns, and preferably has a melting point of about 60 to 130° C., more preferably about 80 to 120° C. Wax layer 219 preferably comprises a polyethylene-based wax and may be printed (preferably by screen printing) from a composition comprising 1350 parts Acumist D5 powdered wax (Honeywell, Morristown, N.J.), 450 parts ME 48040 M2 wax emulsion (Michaelman, Cincinnati, Ohio), 300 parts Tafigel PUR 61 thickener (Ultra Additives, Clover, S.C.), 36 parts Dehydran 1620 defoamer (Cognis, Ambler, Pa.), 24 parts Zonyl FSA wetting agent (DuPont, Wilmington, Del.), and 5400 parts water.

Preferably, the aforementioned formulation is prepared using a Hockmeyer mixer (Hockmeyer Equipment Corporation, Elizabeth City, N.C.) to form a uniform, stable wax slurry, which is storage stable under ambient conditions in a closed container. Screen printing of the formulation may be performed using a 250 mesh screen at a print speed of 2100 imprints per hour. The printed wax layer may be dried and melted by heat from UV and IR lamps of a Smag press (Smag Graphique, Savigny-Sur-Orge Cedex, France). Solidification and crystallization of the wax may be achieved by forced air cooling after exiting the heating zone.

It should be understood that it may not be necessary in all instances to include both release layer 217 and wax layer 219 in laminate 211 in order to achieve the desired release of the transfer portion from the support portion 213. Therefore, it may be acceptable in certain instances to omit release layer 217 from laminate 211.

It should also be understood that wax layer 219 may be replaced with a layer of silicone.

Laminate 211 further comprises a transfer portion 221 (it being understood that, even though only a single transfer portion 221 is shown in FIG. 11, one need not position only one transfer portion 221 per support portion 213, but rather, one may space apart at regular intervals a plurality of identical or different transfer portions 221 on an elongated common web of support portion 213). Transfer portion 221 preferably includes (i) a protective layer 223 printed directly on top of a desired area of wax layer 219 and (ii) an ink layer 225 printed directly onto protective layer 223. Preferably, the peripheries of protective layer 223 and ink layer 225 match one another.

Protective layer 223 may be identical to protective layer 123 of laminate 111, and ink layer 223 may be identical to ink layer 125 of laminate 111.

Image forming laminate 211 may be applied to an article and, thereafter, removed therefrom in the same manner as image forming laminate 111.

One potential problem with image forming laminates of the type represented by laminates 111, 151 and 211 is that, where such laminates are used to label porous articles, such as garments and other fabric articles, the transferred ink layer is placed in direct contact with the porous article. As a result, some or all of the transferred ink layer may seep into the porous article, as opposed to remaining on the surface of the porous article. As can readily be appreciated, such seepage of the ink layer into the porous article may complicate the removal of said ink layer using image removing laminate 14 or image removing laminate 41.

Figure 12:
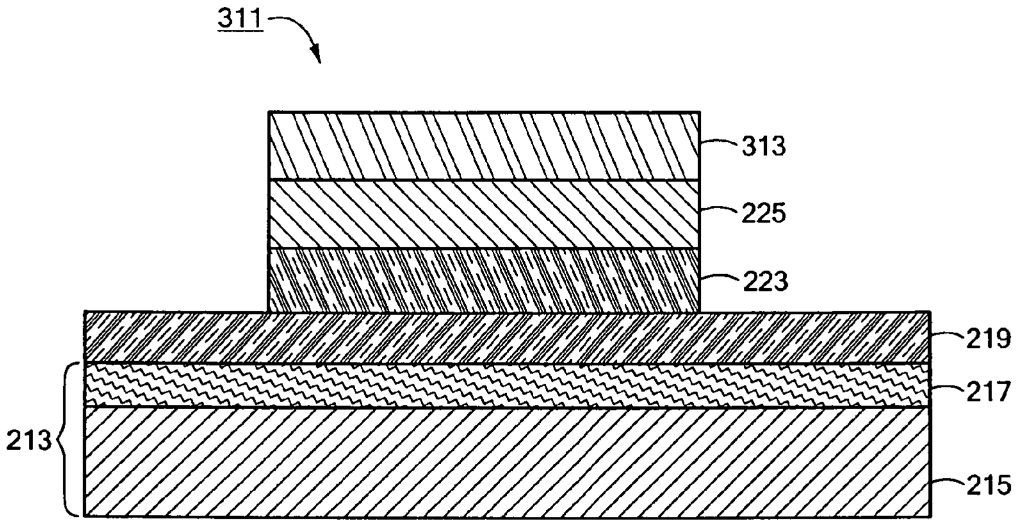
FIG. 12 is a schematic section view of a sixth alternative embodiment to that shown in FIG. 1 of an image forming laminate.

Referring now to FIG. 12, there is shown a schematic section view of a sixth alternative embodiment of an image forming laminate, said image forming laminate being constructed according to the teachings of the present invention and represented generally by reference numeral 311.

Laminate 311 is similar in most respects to laminate 211, the principal difference between the two laminates being that laminate 311 further comprises a spacer 313 printed directly onto ink layer 225 and bonded thereto. Spacer 313, which is intended to prevent the above-described problem of seepage of ink layer 225 into an article being labeled, comprises a material which, when activated by heat (preferably at typical heat-transfer temperatures) and/or light, becomes bondable to the article being labeled. Preferably, the bond between spacer 313 and the article being labeled is sufficiently strong so that the transferred label is capable of remaining on the article under adverse conditions (such as laundering in the case of garments and the like) so as to form a lasting image on the article. At the same time, however, the bond between spacer 313 and the article being labeled and/or the bond between spacer 313 and ink layer 225 is preferably weaker than the bond between ink layer 225 and remover layer 21 of image removing laminate 14 (or image removing laminate 41) so that, if desired, ink layer 225 may be removed from the article.

Where, for example, ink layer 225 is formed using a PVC ink or thermal transfer ink and the article being labeled is a garment or other fabric article, spacer 313 may comprise, for example, a PVC resin, an ethylene vinyl acetate (EVA) resin or another like resin having a desirably low strength and low $T_g$. An example of a suitable composition for use in making spacer 313 comprises 100 parts Geon 137 PVC resin (PolyOne Corporation, Avon Lake, Ohio), 55 parts Santicizer 160 plasticizer (Ferro, Cleveland, Ohio), and 55 parts dioctyl phthalate plasticizer (ChemCentral, Bedford Park, Ill.). Where ink layer 225 is formed using an acrylic-based ink, a polyester-based ink or a polyurethane-based ink, spacer 313 may comprise a suitable acrylic resin, polyester resin or polyurethane resin, respectively.

As can readily be appreciated, because of the presence of spacer 313, certain inks that would not otherwise be desirable for use in making ink layer 225 (because of their seepage into the article being labeled and/or because of their strong bonding to the article being labeled) may be used.

Spacer 313, which preferably has a thickness of about 1 to 15 microns, is formed in the conventional manner by depositing, preferably by screen printing, a composition of the type described above onto ink layer 225 and, thereafter, allowing any volatile component(s) of the ink composition(s) to evaporate, leaving only the non-volatile ink components to form layer 313.

Preferably, the peripheries of protective layer 223, ink layer 225 and spacer 313 match one another.

Image forming laminate 311 may be applied to an article and, thereafter, removed therefrom in the same manner as image forming laminate 111. As can readily be appreciated, although it is preferred that all of protective layer 223, ink layer 225 and spacer 313 be removed from an article using image removing laminate 14 (or image removing laminate 41), it is not essential that spacer 313 be removed from the article where the image is wholly contained within ink layer 225.

Figure 13:
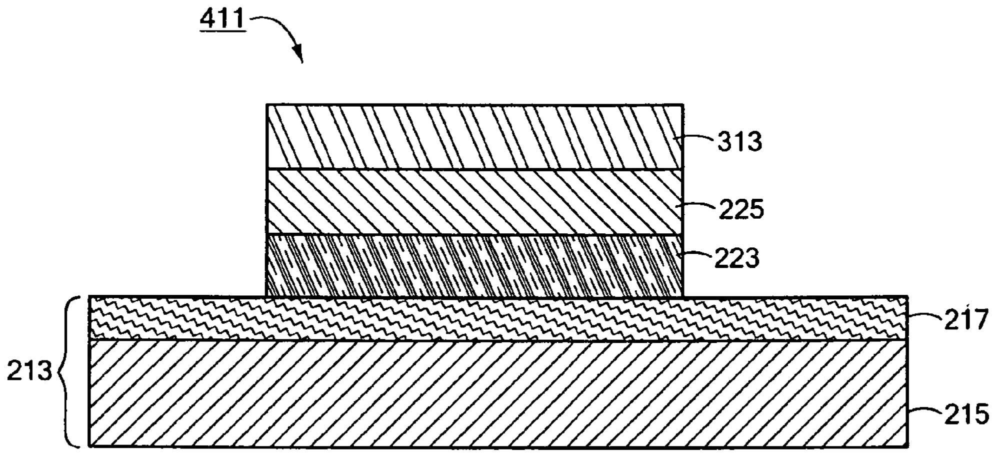
FIG. 13 is a schematic section view of a seventh alternative embodiment to that shown in FIG. 1 of an image forming laminate.

Referring now to FIG. 13, there is shown a schematic section view of a seventh alternative embodiment of an image forming laminate, said image forming laminate being constructed according to the teachings of the present invention and represented generally by reference numeral 411.

Laminate 411 is similar in most respects to laminate 311, the principal difference between the two laminates being that laminate 411 does not include a layer corresponding to wax layer 219 of laminate 311.

Image forming laminate 411 may be applied to an article and, thereafter, removed therefrom in the same manner as image forming laminate 111.

Figure 14:
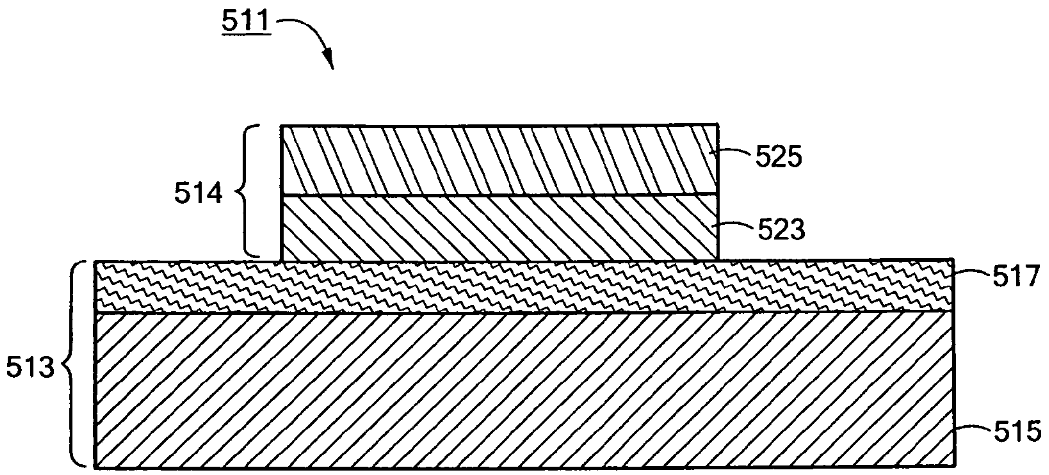
FIG. 14 is a schematic section view of an eighth alternative embodiment to that shown in FIG. 1 of an image forming laminate.

Referring now to FIG. 14, there is shown a schematic section view of an eighth alternative embodiment of an image forming laminate, said image forming laminate being constructed according to the teachings of the present invention and represented generally by reference numeral 511.

Laminate 511 comprises a support portion 513 and a transfer portion 514, transfer portion 514 being releasably mounted on support portion 513 so as to be transferable from support portion 513 to an article by pressing transfer portion 514 of laminate 511 against the article while applying heat and/or light to transfer portion 514.

Support portion 513, in turn, comprises a carrier 515 and a release layer 517. Carrier 515 is identical to carrier 115 of laminate 111, and release layer 517 is identical to release layer 117 of laminate 111.

Transfer portion 514, in turn, comprises (i) an ink layer 523 printed directly on top of a desired area of release layer 517 and (ii) an adhesive layer 525 printed directly onto ink layer 523. Preferably, the periphery of adhesive layer 525 matches that of ink layer 523. (It should be understood that, even though only a single transfer portion 514 is shown on a slightly oversized support portion 513 in FIG. 14, one need not position only one transfer portion 514 per support portion 513, but rather, one may space apart at regular intervals a plurality of identical or different transfer portions 514 on an elongated common web of support portion 513).

Ink layer 523, which layer may actually comprise either a single ink layer or a plurality of ink layers, may be formed from one or more of a wide variety of different inks, provided that the resultant layer 523 is releasable from release layer 517, possesses an acceptable degree of adhesion to adhesive layer 525 to form a lasting image on an article, and is strongly bondable to remover layer 21 to permit the removal of ink layer 523 from an article. Inks suitable for use in making ink layer 523 include PVC-based inks (both cross-linked and non-cross-linked), thermal transfer inks, ink jet inks, laser toners, polyester inks, polyurethane inks and acrylic inks. An example of a suitable ink composition for use in forming ink layer 523 comprises 100 parts GNS Bear's Navy ink (PolyOne Corporation, Avon Lake, Ohio), 5 parts Geon 138 PVC resin (PolyOne Corporation, Avon Lake, Ohio), and 10 parts Acumist B9 wax (Honeywell Corporation, Morristown, N.J.). Another example of a suitable ink composition for use in making ink design layer 523 comprises 144 parts Geon 137 PVC resin (PolyOne Corporation, Avon Lake, Ohio), 80 parts CYMEL 303 hexamethoxymethyl melamine crosslinker (Cytec Corp., West Paterson, N.J.), 54 parts Santicizer 160 benzyl butyl phthalate plasticizer (Ferro, Cleveland, Ohio), 54 parts dioctyl phthalate plasticizer (ChemCentral, Bedford Park, Ill.), 25.2 parts CYCAT 296-9 catalyst (Cytec Corp., West Paterson, N.J.), 20.08 parts Violet PC colorant (PolyOne Corporation, Avon Lake, Ohio), 15.48 parts Blue PC colorant (PolyOne Corporation, Avon Lake, Ohio) and 5.04 parts Bright Yellow PC colorant (PolyOne Corporation, Avon Lake, Ohio).

Ink layer 523, which preferably has a thickness of about 0.1 to 30 microns, more preferably about 1 to 20 microns, is formed by printing one or more ink compositions of the type described above onto release layer 517 and, thereafter, allowing any volatile component(s) of the ink composition(s) to evaporate, leaving only the non-volatile ink components to form layer 523.

As discussed above in connection with ink layer 17, ink layer 523 may comprise a first portion and a second portion wherein said first portion is formed by screen printing, gravure printing or flexographic printing and is directed to constant information and wherein said second portion is formed by thermal transfer printing, laser printing or ink jet printing and is directed to variable information. In this manner, custom labels may be produced.

Adhesive layer 525 comprises a material which, when activated by heat (preferably at typical heat-transfer temperatures) and/or light, becomes bondable to the article being labeled. Preferably, the bond between adhesive layer 525 and the article being labeled is sufficiently strong so that the transferred label is capable of remaining on the article under adverse conditions (such as laundering in the case of garments and the like) so as to form a lasting image on the article. At the same time, however, the bond between adhesive layer 525 and the article being labeled and/or the bond between adhesive layer 525 and ink layer 523 is preferably weaker than the bond between ink layer 523 and remover layer 21 of image removing laminate 14 (or image removing laminate 41) so that, if desired, ink layer 523 may be removed from the article.

Where, for example, ink layer 523 is formed using a PVC ink or thermal transfer ink and the article being labeled is a garment or other fabric article, adhesive layer 525 may comprise, for example, a PVC resin or a polyester resin. An example of a suitable composition for use in making adhesive layer 523 comprises 300 parts HMP 5184 P polyester powder adhesive resin (Bostik-Findley, Middleton, Mass.), 100 parts PKHW 35 phenoxy dispersion binder (InChemRez Inc., Rock Hill, S.C.), 24 parts Tafigel PUR 61 thickener (Ultra Additives, Inc., Clover, S.C.), 4 parts Dehydran 1620 defoamer (Cognis Corp., Ambler, Pa.), 1 part Zonyl FSA wetting agent (DuPont, Wilmington, Del.), and 465 parts water. Where ink layer 225 is formed using an acrylic-based ink, a polyester-based ink or a polyurethane-based ink, adhesive layer 525 may comprise a suitable acrylic resin, polyester resin or polyurethane resin, respectively.

Adhesive layer 525, which preferably has a thickness of about 10 to 200 microns, more preferably about 20 to 80 microns, is preferably formed by depositing, by screen printing, gravure printing, flexographic printing or the like, an adhesive composition of the type described above onto ink layer 523 and then evaporating the volatile component(s) of the composition, leaving only the non-volatile solid component(s) thereof to form layer 525.

It should be understood that image forming laminate 511 could additionally or alternatively include an inventory control mechanism or a security feature (anti-theft, anti-counterfeiting, anti-parallel imports) in the form of one or more security materials (such as a security ink or a security additive of the type described above) incorporated into ink layer 523 and/or adhesive layer 525.

Image forming laminate 511 may be applied to an article and, thereafter, removed therefrom in the same manner as image forming laminate 111. As can readily be appreciated, although it is preferred that both ink layer 523 and adhesive layer 525 be removed from an article using image removing laminate 14 (or image removing laminate 41), it is not essential that adhesive layer 525 be removed from the article where the image is wholly contained within ink layer 523.

Figure 15:
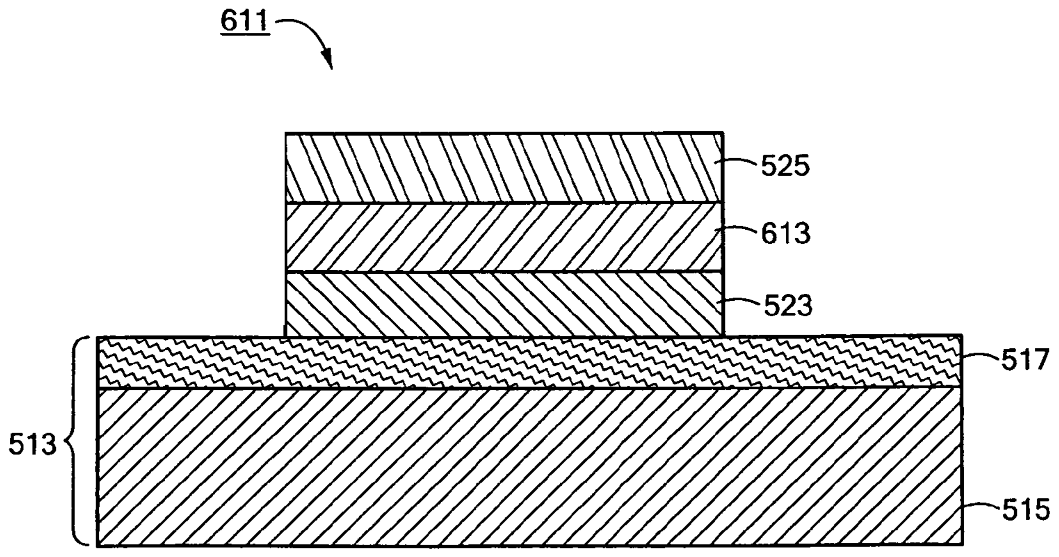
FIG. 15 is a schematic section view of a ninth alternative embodiment to that shown in FIG. 1 of an image forming laminate.

Referring now to FIG. 15, there is shown a schematic section view of a ninth alternative embodiment of an image forming laminate, said image forming laminate being constructed according to the teachings of the present invention and represented generally by reference numeral 611.

Image forming laminate 611 is similar in most respects to image forming laminate 511, the principal difference between the two image forming laminates being that image forming laminate 611 further includes a primer layer 613 interposed between ink layer 523 and adhesive layer 525 to promote adhesion therebetween. Where, for example, ink layer 523 is PVC-based and adhesive layer 525 is polyester-based, primer layer 613 may include, for example, a PVC-based material. An example of a suitable material for use in forming primer layer 613 is Printable Adhesive (PolyOne, Cleveland, Ohio). (Where both ink layer 523 and adhesive layer 525 are acrylic-based, polyester-based or polyurethane-based, primer layer 613 is preferably acrylic-based, polyester-based or polyurethane-based, respectively.) Primer layer 613, which preferably has a thickness of about 5 to 50 microns, more preferably 10 to 30 microns, is preferably formed by printing a material of the type described above onto ink layer 523 and allowing any volatile components thereto to evaporate, leaving only the non-volatile components thereof to form primer layer 613.

Image forming laminate 611 may be applied to an article and, thereafter, removed therefrom in the same manner as image forming laminate 111. As can readily be appreciated, although it is preferred that all of ink layer 523, primer layer 613 and adhesive layer 525 be removed from an article using image removing laminate 14 (or image removing laminate 41), it is not essential that primer layer 613 and adhesive layer 525 be removed from the article where the image is wholly contained within ink layer 523.

It should be noted that, whereas image removing laminates 14 and 41 have been described above as being used with various image forming laminates of the type that are activated for application to an article using heat and/or light, image removing laminates 14 and 41 are not limited to use with such image forming laminates and may also be used to remove ink images that have been applied to an article using pressure-sensitive adhesives and the like.

The following examples are provided for illustrative purposes only and are in no way intended to limit the scope of the present invention:

Example 1

An image removing laminate having a construction similar to that of image removing laminate 41 was prepared as follows: First, a polyethylene terephthalate (PET) film was coated with a 50 micron layer of Sancure 835 polyurethane dispersion (Noveon Corp., Cleveland, Ohio). Next, the coating was dried by heating the coated product in an oven at 120° C. for 3 minutes. Next, a PVC plastisol prepared by combining 100 g of Geon 137 PVC resin (PolyOne Corp., Avon Lake, Ohio), 55 g of dioctyl phthalate plasticizer (ChemCentral, Bedford, Ill.) and 55 g of Santicizer 160 plasticizer (Ferro Corp., Cleveland, Ohio) was coated on top of the above-described Sancure 835 coating. The plastisol was then fused by heating the coated product at 120° C. for 3 minutes.

An image forming laminate having a construction similar to that of image forming laminate 211 was prepared as follows: First, a wax formulation consisting of 1350 parts Acumist D5 powdered wax (Honeywell Corp., Morristown, N.J.), 450 parts ME 48040 M2 wax emulsion (Michaelman, Cincinnati, Ohio), 300 parts Tafigel PUR 61 thickener (Ultra Additives, Clover, S.C.), 36 parts Dehydran 1620 defoamer (Cognis, Ambler, Pa.) 24 parts Zonyl FSA (DuPont, Wilmington, Del.) and 5400 parts water was printed onto the release-coated side of a Mylar® A701 film (DuPont Teijin Films, Hopewell, Va.). The printed product was then dried in an oven. Next, a protective layer formulation consisting of 60 parts Geon 137 PVC resin, 33 parts of dioctyl phthalate and 33 parts Santicizer 160 plasticizer was printed onto the wax layer. The printed product was then dried in an oven. Next, an ink layer formulation consisting of 720 parts Geon 137 PVC resin, 350 parts dioctyl phthalate, 350 parts Santicizer 160 plasticizer, 140 parts Violet PC (PolyOne, Avon Lake, Ohio), 77.4 parts Blue PC (PolyOne, Avon Lake, Ohio), and 25.2 parts Bright Yellow PC (Polyone, Avon Lake, Ohio) was printed onto the protective layer. The printed product was then dried in an oven. All of the above printing steps were performed using a Galaxy 2000 screen printer (Smag Graphique, Savigny-Sur-Orge Cedex, France).

The above-described image forming laminate was then placed on top of an underwear T-shirt, with the ink layer in direct contact with the T-shirt, and the transfer portion of the image forming laminate was transferred to the T-shirt under a pressure of 40 psi at 400° F. for 2 seconds using an Avery Dennison Heat Transfer Bonder Model No. 79200-00-3 (Avery Dennison Corp., Pasadena, Calif.). Next, the labeled T-shirt was subjected to fifty home laundry cycles and then inspected. The image remained intact on the fabric.

A second labeled T-shirt was prepared in the above-described manner (except that said second labeled T-shirt was not subjected to fifty home laundry cycles). Next, the above-described image removing laminate was placed on top of the labeled T-shirt, with the PVC layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product was then cooled to room temperature. The label was then removed from the T-shirt by peeling the image removing laminate away from the T-shirt. No trace of the image was left behind on the T-shirt.

An image forming laminate of the same type described above was then placed on the same T-shirt in the area from which the previous label had been removed. The transfer portion of this image forming laminate was then transferred to the T-shirt in the same manner described above. The newly labeled T-shirt was then subjected to 37 home laundry cycles and then inspected. The new image remained intact on the T-shirt.

Example 2

An image forming laminate having a construction similar to that of image forming laminate 111 was prepared as follows: First, a protective plastisol consisting of 60 parts Geon 137 PVC resin, 33 parts dioctyl phthalate and 33 parts Santicizer 160 plasticizer was printed onto the release-coated side of a Mylar® A701 film (DuPont Teijin Films, Hopewell, Va.). The printed product was then dried in an oven. Next, a blue plastisol ink formulation consisting of 720 parts Geon 137 PVC resin, 350 parts dioctyl phthalate, 350 parts Santicizer 160 plasticizer, 140 parts Violet PC (PolyOne, Avon Lake, Ohio), 77.4 parts Blue PC (PolyOne, Avon Lake, Ohio), and 25.2 parts Bright Yellow PC (Polyone, Avon Lake, Ohio) was printed onto the protective layer. The printed product was then dried in an oven. All of the above printing steps were performed using a Galaxy 2000 screen printer (Smag Graphique, Savigny-Sur-Orge Cedex, France).

The above-described image forming laminate was then placed on top of an underwear T-shirt, with the ink layer in direct contact with the T-shirt, and the transfer portion of the image forming laminate was transferred to the T-shirt under a pressure of 40 psi at 400° F. for 2 seconds using an Avery Dennison Heat Transfer Bonder Model No. 79200-00-3 (Avery Dennison Corp., Pasadena, Calif.).

Next, an image removing laminate of the type described above in Example 1 was placed on top of the labeled T-shirt, with the PVC layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product was then cooled to room temperature. The label was then removed from the T-shirt by peeling the image removing laminate away from the T-shirt. No trace of the image was left behind on the T-shirt.

Example 3

An image forming laminate having a construction similar to that of image forming laminate 311 was prepared as follows: First, a wax formulation of the type described in Example 1 was printed onto the release-coated side of a Mylar® A701 film (DuPont Teijin Films, Hopewell, Va.), and the resulting product was dried in an oven. Next, a protective plastisol formulation of the type described in Example 2 was printed onto the above-described wax layer, and the resulting product was dried in an oven. Next, a blue plastisol ink formulation of the type described in Example 2 was printed onto the above-described protective layer, and the resulting product was dried in an oven. Finally, a thin layer of the above-described protective plastisol formulation was printed onto the above-described ink layer to form a spacer layer, and the resulting product was dried in an oven. All of the above printing steps were performed using a Galaxy 2000 screen printer (Smag Graphique, Savigny-Sur-Orge Cedex, France).

The above-described image forming laminate was then placed on top of an underwear T-shirt, with the spacer layer in direct contact with the T-shirt, and the transfer portion of the image forming laminate was transferred to the T-shirt under a pressure of 40 psi at 400° F. for 2 seconds using an Avery Dennison Heat Transfer Bonder Model No. 79200-00-3 (Avery Dennison Corp., Pasadena, Calif.).

Next, an image removing laminate of the type described above in Example 1 was placed on top of the labeled T-shirt, with the PVC layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product was then cooled to room temperature. The label was then removed from the T-shirt by peeling the image removing laminate away from the T-shirt. No obvious image was left behind on the T-shirt.

Example 4

An image removing laminate having a construction similar to that of image removing laminate 14 was prepared by coating onto a PET film a mixture of 50 g Sancure 835 polyurethane dispersion, 0.5 g Tafigel PUR 61 thickener and 0.2 g Dehydran 1620 defoamer with 100 micron wet thickness, and then by drying the coated product by heating in an oven at 120° C. for 3 minutes.

An image forming laminate of the type described above in Example 1 was then transferred to an underwear T-shirt at a pressure of 40 psi at 400° F. for 2 seconds using an Avery Dennison Heat Transfer Bonder Model 79200-00-3 to yield a labeled T-shirt. Next, the image removing laminate of the present example was placed on the transferred label, with the polyurethane-based coating of the image removing laminate in direct contact with the label. Next, the image removing laminate was bonded to the transferred label at a pressure of 40 psi at 400° F. for 2 seconds using an Avery Dennison Heat Transfer Bonder Model 79200-00-3. The resulting laminate was then cooled to room temperature, and the image was removed by peeling away the image removing laminate. No trace of an image was left behind on the T-shirt.

Example 5

An image forming laminate having a construction similar to that of image forming laminate 211 was prepared as follows: First, a wax formulation of the type described above in Example 1 was printed onto the release-coated side of a Mylar® A701 film, and the printed product was dried in an oven. Next, a protective layer formulation of the type described in Example 1 was printed onto the wax layer, and the printed product was dried in an oven. Next, an ink layer formulation of the type described above in Example 1 was printed onto the protective layer, and the printed product was dried in an oven. All of the above printing steps were performed using a Galaxy 2000 screen printer (Smag Graphique, Savigny-Sur-Orge Cedex, France). Finally, a thermal transfer image was printed onto the protective layer in an area left blank by the aforementioned ink layer, said thermal transfer image being printed using an Armor AXR 600B ribbon (Armor USA Inc., Hebron, Ky.) and an Avery Thermal Transfer Printer Model No. 64-04 (Avery Dennison Corp., Pasadena, Calif.).

The above-described image forming laminate was then placed on top of an underwear T-shirt, with the ink layer in direct contact with the T-shirt, and the transfer portion of the image forming laminate was transferred to the T-shirt under a pressure of 40 psi at 400° F. for 2 seconds using an Avery Dennison Heat Transfer Bonder Model No. 79200-00-3 (Avery Dennison Corp., Pasadena, Calif.).

Next, an image removing laminate of the type described above in Example 1 was placed on top of the labeled T-shirt, with the PVC layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product was then cooled to room temperature. The label was then removed from the T-shirt by peeling the image removing laminate away from the T-shirt. No sign of the image was left behind on the T-shirt.

Example 6

An image forming laminate having a construction similar to that of image forming laminate 211 was prepared as follows: First, a wax formulation of the type described above in Example 1 was printed onto the release-coated side of a Mylar® A701 film, and the printed product was dried in an oven. Next, a protective layer formulation of the type described in Example 1 was printed onto the wax layer, and the printed product was dried in an oven. Next, an ink layer formulation comprising 178 parts Geon 137 PVC resin, 98 parts Santicizer 160 plasticizer, 98 parts dioctyl phthalate plasticizer, 240 parts Violet PC colorant, 180 parts Bright Blue PC colorant (PolyOne Corp., Cleveland, Ohio), and 150 Light Brown PC colorant (PolyOne Corp., Cleveland, Ohio) was printed onto the protective layer, and the printed product was dried in an oven. All of the above printing steps were performed using a Galaxy 2000 screen printer (Smag Graphique, Savigny-Sur-Orge Cedex, France).

The above-described image forming laminate was then placed on top of an underwear T-shirt, with the ink layer in direct contact with the T-shirt, and the transfer portion of the image forming laminate was transferred to the T-shirt under a pressure of 40 psi at 400° F. for 2 seconds using an Avery Dennison Heat Transfer Bonder Model No. 79200-00-3 (Avery Dennison Corp., Pasadena, Calif.).

Next, an image removing laminate of the type described above in Example 1 was placed on top of the labeled T-shirt, with the PVC layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product was then cooled to room temperature. The label was then removed from the T-shirt by peeling the image removing laminate away from the T-shirt. No residual image was left behind on the T-shirt.

Example 7

The image removing laminate of Example 1 was placed on top of an underwear T-shirt, with the ink layer in direct contact with the T-shirt, and the transfer portion of the image forming laminate was transferred to the T-shirt under a pressure of 60 psi at 375° F. for 2 seconds using a Hastings heat transfer bonder model no. US1-HT (Hastings Manufacturing Inc., St. Louis, Mo.).

Next, an image removing laminate of the type described above in Example 4 was placed on top of the labeled T-shirt, with the PVC layer of the image removing laminate being placed directly on top of the transferred label. The image removing laminate was then bonded to the label under a pressure of 40 psi at 400° F. for 2 seconds using the aforementioned Hastings heat transfer bonder model no. US1-HT. The resulting product was then cooled to room temperature. The label was then removed from the T-shirt by peeling the image removing laminate away from the T-shirt. A weak trace residue of the blue image remained on the top of the T-shirt.

Example 8

An image forming laminate of the type described in Example 1 was placed on top of an underwear T-shirt, with the ink layer in direct contact with the T-shirt, and the transfer portion of the image forming laminate was transferred to the T-shirt under a pressure of 40 psi at 400° F. for 2 seconds using an Avery Dennison Heat Transfer Bonder Model No. 79200-00-3.

An image removing laminate having a construction similar to that of image removing laminate 14 was prepared as follows: First, a mixture of 50 g of Sancure 835 polyurethane dispersion, 0.5 g of Tafigel PUR 61 thickener, 0.2 g of Dehydran 1620 defoamer and 1 g of CX-100 crosslinker (NeoResins, Wilmington, Mass.) was coated on a PET film to a 100 micron wet thickness. Next, the coating was dried by heating the coated product in an oven at 120° C. for 3 minutes.

Next, the aforementioned image removing laminate was placed on top of the above-described labeled T-shirt, with the polyurethane-containing layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product was then cooled to room temperature. The label was then removed from the T-shirt by peeling the image removing laminate away from the T-shirt. No residual image was left behind on the T-shirt.

In comparing the results of Examples 1, 4 and 8, it may be noted that the image removing laminate of Example 8 removed less of the fine fabric hair from the labeled T-shirt than did the image removing laminate of Example 4 and that the image removing laminate of Example 4 removed less of the fine fabric hair from the labeled T-shirt than did the image removing laminate of Example 1.

Example 9

An image forming laminate was prepared, said image forming laminate being identical to that of Example 6, except that the ink layer thereof was replaced with a thermal transfer printed ink layer formed using an AXR 600 thermal transfer ribbon ink (Armor, Hebron, Ky.).

The aforementioned image forming laminate was then placed on top of an underwear T-shirt, with the ink layer in direct contact with the T-shirt, and the transfer portion of the image forming laminate was transferred to the T-shirt using an Avery Dennison Heat Transfer Bonder Model No. 79200-00-3, under conditions of 40 psi for 1 second at 300° F. for the moving die and 500° F. for the bottom plate.

An image removing laminate identical to that of Example 1 was then placed on top of the above-described labeled T-shirt, with the PVC layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product was then cooled to room temperature. The label was then removed from the T-shirt by peeling the image removing laminate away from the T-shirt. No residual image was left behind on the T-shirt.

Example 10

An image forming laminate having a construction similar to that of image forming laminate 13 was prepared by thermal transfer printing the thermal transfer ink of Example 9 onto a PVC support film (Avery Dennison PVC 4A film, Avery Dennison Corp., Pasadena, Calif.).

The aforementioned image forming laminate was then placed on top of an underwear T-shirt, with the PVC support film in direct contact with the T-shirt, and the image forming laminate was bonded to the T-shirt using an Avery Dennison Heat Transfer Bonder Model No. 79200-00-3, under conditions of 40 psi for 1 second at 300° F. for the moving die and 500° F. for the bottom plate.

An image removing laminate identical to that of Example 4 was then placed on top of the above-described labeled T-shirt, with the PVC layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product was then cooled to room temperature. The label was then removed from the T-shirt by peeling the image removing laminate away from the T-shirt. No residual image was left behind on the T-shirt.

Example 11

An image forming laminate having a construction similar to that of image forming laminate 611 was prepared as follows: First, an ink formulation consisting of 100 parts GNS Bear's Navy ink, 5 parts Geon 138 PVC resin and 10 parts Acumist B9 wax was printed onto the release-coated side of a Mylar® A701 film. The printed product was then dried in an oven. Next, a PVC primer layer consisting of Printable Adhesive primer (PolyOne, Cleveland, Ohio) was printed onto the aforementioned ink layer. The printed product was then dried in an oven. Next, an adhesive layer formulation consisting of 300 parts HMP 5184 P powder polyester adhesive, 100 parts PHKW 35 phenoxy binder, 24 parts Tafigel PUR 61 thickener, 4 parts Dehydran 1620 defoamer, 1 part Zonyl FSA wetting agent and 465 parts water was printed onto the aforementioned primer layer. The printed product was then dried in an oven. All of the above printing steps were performed using a Galaxy 2000 screen printer (Smag Graphique, Savigny-Sur-Orge Cedex, France).

The aforementioned image forming laminate was then placed on top of an underwear T-shirt, with the PVC support film in direct contact with the T-shirt, and the image forming laminate was bonded to the T-shirt using an Avery Dennison Heat Transfer Bonder Model No. 79200-00-3, under conditions of 40 psi for 1 second at 300° F. for the moving die and 500° F. for the bottom plate.

An image removing laminate identical to that of Example 4 was then placed on top of the above-described labeled T-shirt, with the PVC layer of the image removing laminate being placed directly on top of the transferred label. The image removing laminate was then bonded to the label under a pressure of 40 psi at 400° F. for 2 seconds using an Avery Dennison Heat Transfer Bonder Model No. 79200-00-3. The resulting product, while it was still warm, was then removed from the T-shirt by peeling the image removing laminate away from the T-shirt. The image was removed, but a trace amount of adhesive may have remained. It may be necessary to repeat the removal step one more time in order to remove the adhesive residue from the T-shirt.

The embodiments of the present invention recited herein are intended to be merely exemplary and those skilled in the art will be able to make numerous variations and modifications to it without departing from the spirit of the present invention. For example, it should be appreciated that one may add, either directly or through trans-layer migration, trace or non-functional minor amounts of waxes or silicones to the release layer described herein as "non-wax" and "non-silicone" without being outside the scope of applicants' invention. Thus, the terms "non-wax" and "non-silicone" as used herein is intended to embrace this possibility. All such variations and modifications are intended to be within the scope of the present invention as defined by the claims appended hereto.

What is claimed is:

1. A label assembly suitable for use in forming a lasting, yet removable, image on an article, said label assembly comprising:

(a) an image forming laminate for forming an image on the article, said image forming laminate comprising an ink layer, an image support and a protective layer, said image support comprising adhesive means for bonding directly to the article and having a first surface adapted to face towards the article and a second surface adapted to face away from the article, said ink layer being bonded to said second surface of said image support, said protective layer being bonded to said ink layer opposite said image support; and (b) an image removing laminate for removing said image from the article, said image removing laminate comprising a remover layer and a remover support, said remover layer being bonded to said remover support, said remover layer, upon being activated by at least one of heat and light, comprising adhesive means for bonding to said ink layer of said image forming laminate through said protective layer of said image forming laminate;

(c) wherein the image forming laminate and the image removing laminate are constituted such that, upon bonding of said image removing laminate to said ink layer, the bonding between said image removing laminate and said ink layer is stronger than the bonding between said ink layer and the article.

2. The label assembly as claimed in claim 1 wherein the image support comprises a film selected from the group consisting of PVC-based, polyester-based, polyurethane-based and acrylic-based films.

3. A label assembly suitable for use in forming a lasting, yet removable, image on an article, said label assembly comprising:

(a) an image forming laminate for forming an image on the article, said image forming laminate comprising an image support, an ink layer, and an adhesive layer, said image support having a first surface adapted to face towards the article and a second surface adapted to face away from the article, said ink layer being bonded to said second surface of said image support, said adhesive layer being directly bondable to the article and being bonded to said first surface of said image support, wherein said image forming laminate further comprises a protective layer, said protective layer being bonded to said ink layer opposite said image support; and (b) an image removing laminate for removing said image from the article, said image removing laminate comprising a remover layer and a remover support, said remover layer being bonded to said remover support, said remover layer, upon being activated by at least one of heat and light, comprising adhesive means for bonding to said ink layer of said image forming laminate through said protective layer of said image forming laminate;

(c) wherein the image forming laminate and the image removing laminate are constituted such that, upon bonding of said image removing laminate to said ink layer, the bonding between said image removing laminate and said ink layer is stronger than the bonding between said ink layer and the article.

4. A label assembly suitable for use in forming a lasting, yet removable, image on an article, said label assembly comprising:

(a) an image forming laminate for forming an image on the article, said image forming laminate comprising a support portion and a transfer portion, said transfer portion being releasably mounted on said support portion, said transfer portion being bondable to the article and comprising an ink layer, a spacer layer, said spacer layer being directly bondable to the article and being positioned over said ink layer, and a protective layer under said ink layer, said protective layer being in direct contact with said support portion and being in direct contact with said ink layer; and (b) an image removing laminate for removing said image from the article, said image removing laminate comprising a remover layer and a remover support, said remover layer being bonded to said remover support, said remover layer, upon being activated by at least one of heat and light, being bondable to said ink layer of said image forming laminate through said protective layer of said image forming laminate;

(c) wherein the image forming laminate and the image removing laminate are constituted such that, upon bonding of said image removing laminate to said ink layer, the bonding between said image removing laminate and said ink layer is stronger than the bonding between said ink layer and the article.

5. The label assembly as claimed in claim 4 wherein said support portion comprises a carrier and a release coating, said release coating being positioned over said carrier, said transfer portion being positioned over said release coating, and wherein said image forming laminate further comprises a wax release layer, said wax release layer being interposed between and in direct contact with said release coating of said support and said protective layer.

6. A label assembly suitable for use in forming a lasting, yet removable, image on an article, said label assembly comprising:

(a) an image forming laminate for forming an image on the article, said image forming laminate comprising a support portion and a transfer portion, said support portion comprising a carrier and a release coating, said release coating being positioned over said carrier, said transfer portion being releasably mounted on said support portion, said transfer portion being bondable to the article and comprising an ink layer and at least one of an adhesive layer over said ink layer and a protective layer under said ink layer, wherein said transfer portion includes said ink layer and said protective layer, said protective layer being in direct contact with said ink layer, said image forming laminate further comprising a wax release layer, said wax release layer being interposed between and in direct contact with said release coating of said support and said protective layer; and (b) an image removing laminate for removing said image from the article, said image removing laminate comprising a remover layer and a remover support, said remover layer being bonded to said remover support, said remover layer, upon being activated by at least one of heat and light, being bondable to said ink layer of said image forming laminate through said protective layer of said image forming laminate;

(c) wherein the image forming laminate and the image removing laminate are constituted such that, upon bonding of said image removing laminate to said ink layer, the bonding between said image removing laminate and said ink layer is stronger than the bonding between said ink layer and the article.

7. The label assembly as claimed in claim 6 wherein said ink layer is directly bondable to the article.

8. The label assembly as claimed in claim 7 wherein said ink layer, upon being activated by at least one of heat and light and pressed against the article, adheres to the article.

9. A label assembly suitable for use in forming a lasting, yet removable, image on an article, said label assembly comprising:

(a) an image forming laminate for forming an image on the article, said image forming laminate comprising a support portion and a transfer portion, said transfer portion being releasably mounted on said support portion, said transfer portion being bondable to the article and comprising an ink layer and at least one of an adhesive layer over said ink layer and a protective layer under said ink layer, wherein said transfer portion comprises said ink layer and said adhesive layer, said adhesive layer being directly bondable to the article, said adhesive layer being positioned over said ink layer; and (b) an image removing laminate for removing said image from the article, said image removing laminate comprising a remover layer and a remover support, said remover layer being bonded to said remover support, said remover layer, upon being activated by at least one of heat and light, being bondable to said ink layer of said image forming laminate;

(c) wherein the image forming laminate and the image removing laminate are constituted such that, upon bonding of said image removing laminate to said ink layer, the bonding between said image removing laminate and said ink layer is stronger than the bonding between said ink layer and the article.

10. The label assembly as claimed in claim 9 wherein said adhesive layer, upon being activated by at least one of heat and light and pressed against the article, adheres to the article.

11. The label assembly as claimed in claim 9 wherein said adhesive layer is in direct contact with said ink layer.

12. The label assembly as claimed in claim 9 wherein said transfer portion further comprises a primer layer interposed between and in direct contact with each of said adhesive layer and said ink layer.

13. A label assembly suitable for use in forming a lasting, yet removable, image on a fabric article, said label assembly comprising:

(a) an image forming laminate for forming an image on the fabric article, said image forming laminate comprising an ink layer and means for bonding said ink layer to the fabric article, wherein said means for bonding said ink layer to the fabric article comprises a support, said ink layer being printed directly onto said support, said support having a surface roughness not exceeding about 15 microns, wherein said support comprises a polyvinyl chloride resin; and (b) an image removing laminate for removing said image from the fabric article, said image removing laminate comprising a remover layer and a remover support, said remover layer, upon being activated by at least one of heat and light, being bondable to said ink layer of said image forming laminate, said remover support being secured to said remover layer;

(c) wherein the image forming laminate and the image removing laminate are constituted such that, upon bonding of said image removing laminate to said ink layer, the bonding between said image removing laminate and said ink layer is stronger than the bonding between said ink layer and the fabric article.

14. A label assembly suitable for use in forming a lasting, yet removable, image on a fabric article, said label assembly comprising:

(a) an image forming laminate for forming an image on the fabric article, said image forming laminate comprising an ink layer and means for bonding said ink layer to the fabric article, wherein said means for bonding said ink layer to the fabric article comprises a support and an adhesive layer, said support being positioned over and bonded to said adhesive layer, said adhesive layer being directly bondable to the fabric article, said ink layer being printed directly onto said support, said support having a surface roughness not exceeding about 15 microns, wherein said adhesive layer comprises a heat-activatable adhesive selected from the group consisting of a PVC-based adhesive, a polyester-based adhesive, a polyurethane-based adhesive and a polyamide-based adhesive; and (b) an image removing laminate for removing said image from the fabric article, said image removing laminate comprising a remover layer and a remover support, said remover layer, upon being activated by at least one of heat and light, being bondable to said ink layer of said image forming laminate, said remover support being secured to said remover layer;

(c) wherein the image forming laminate and the image removing laminate are constituted such that, upon bonding of said image removing laminate to said ink layer, the bonding between said image removing laminate and said ink layer is stronger than the bonding between said ink layer and the fabric article.

15. A label assembly suitable for use in forming a lasting, yet removable, image on a fabric article, said label assembly comprising:

(a) an image forming laminate for forming an image on the fabric article, said image forming laminate comprising an ink layer and means for bonding said ink layer to the fabric article, wherein said means for bonding said ink layer to the fabric article comprises a support, said ink layer being printed directly onto said support, said support having a surface roughness not exceeding about 15 microns, wherein said image forming laminate further comprises a protective layer, said protective layer being positioned over said ink layer; and (b) an image removing laminate for removing said image from the fabric article, said image removing laminate comprising a remover layer and a remover support, said remover layer, upon being activated by at least one of heat and light, comprising adhesive means for bonding to said ink layer of said image forming laminate through said protective layer of said image forming laminate, said remover support being secured to said remover layer;

(c) wherein the image forming laminate and the image removing laminate are constituted such that, upon bonding of said image removing laminate to said ink layer, the bonding between said image removing laminate and said ink layer is stronger than the bonding between said ink layer and the fabric article.

16. The label assembly as claimed in claim 15 wherein said protective layer is in direct contact with said ink layer.

17. The label assembly as claimed in 16 wherein said protective layer comprises at least one of a phenoxy resin, a polyurethane resin, a polyester resin, an acrylic resin and a PVC resin.

18. A label assembly suitable for use in forming a lasting, yet removable, image on a fabric article, said label assembly comprising:

(a) an image forming laminate for forming an image on the fabric article, said image forming laminate comprising an ink layer and means for bonding said ink layer to the fabric article, wherein said means for bonding said ink layer to the fabric article comprises a support, said ink layer being printed directly onto said support, said support having a surface roughness not exceeding about 15 microns; and (b) an image removing laminate for removing said image from the fabric article, said image removing laminate comprising a remover layer and a remover support, said remover layer, upon being activated by at least one of heat and light, being bondable to said ink layer of said image forming laminate, said remover support being secured to said remover layer, wherein said image removing laminate further comprises a tie layer interposed between and in direct contact with each of said remover layer and said remover support;

(c) wherein the image forming laminate and the image removing laminate are constituted such that, upon bonding of said image removing laminate to said ink layer, the bonding between said image removing laminate and said ink layer is stronger than the bonding between said ink layer and the fabric article.

* * * * *